US011166028B2

(12) United States Patent
Eng et al.

(10) Patent No.: US 11,166,028 B2
(45) Date of Patent: Nov. 2, 2021

(54) METHODS AND SYSTEMS FOR PROVIDING VARIABLE BITRATE CONTENT

(71) Applicant: Comcast Cable Communications, LLC, Philadelphia, PA (US)

(72) Inventors: Adam Eng, Golden, CO (US); David Eng, Louisville, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/265,804

(22) Filed: Feb. 1, 2019

(65) Prior Publication Data

US 2020/0252618 A1 Aug. 6, 2020

(51) Int. Cl.
*H04N 19/00* (2014.01)
*H04N 19/14* (2014.01)
*H04N 19/115* (2014.01)

(52) U.S. Cl.
CPC .......... *H04N 19/14* (2014.11); *H04N 19/115* (2014.11)

(58) Field of Classification Search
CPC ............................. H04N 19/14; H04N 19/115
See application file for complete search history.

(56) References Cited

U.S. PATENT DOCUMENTS

| | | | |
|---|---|---|---|
| 9,264,475 B2 * | 2/2016 | Shivadas | H04L 65/605 |
| 10,182,269 B1 * | 1/2019 | Samant | H04N 21/6405 |
| 10,499,085 B1 * | 12/2019 | Douady-Pleven | H04N 19/10 |
| 2007/0081586 A1 * | 4/2007 | Raveendran | H04N 19/137 375/240.1 |
| 2009/0034937 A1 * | 2/2009 | Kusunoki | H04N 21/44008 386/248 |
| 2011/0255555 A1 * | 10/2011 | Alexander | H04L 65/4092 370/468 |
| 2011/0302319 A1 * | 12/2011 | Ha | H04N 21/23439 709/231 |
| 2012/0327779 A1 * | 12/2012 | Gell | H04L 47/2475 370/238 |

(Continued)

OTHER PUBLICATIONS

Extended European Search Report dated Apr. 28, 2020 by the European Patent Office for EP Application No. 20154877.3, filed on Feb. 1, 2019 (12 pages).

(Continued)

*Primary Examiner* — Zhihan Zhou
(74) *Attorney, Agent, or Firm* — Ballard Spahr LLP

(57) ABSTRACT

Provided are methods and systems for providing variable bitrate content (e.g., video content, audio content, multimedia content, etc.). The content may comprise a plurality of portions (e.g., frames, segments, fragments, etc.). Each portion of the content may be tagged and/or associated with a content element. A content element may be associated with and/or indicate one or more of an encoding parameter associated with a respective portion of the content, attributes of the content (e.g., a scene transition, scene change, etc.) associated with the respective portion of the content, or additional content related items (e.g., one or more advertisements, etc.) associated with the respective portion of the content. The content element may be used to determine a bitrate to associate with the respective portion of the content. The content may be received/retrieved according to the determined bitrates.

22 Claims, 8 Drawing Sheets

(56) References Cited

U.S. PATENT DOCUMENTS

| | | | |
|---|---|---|---|
| 2013/0223510 A1* | 8/2013 | Coudurier | H04N 21/23439 375/240.02 |
| 2014/0201382 A1* | 7/2014 | Shivadas | H04L 65/605 709/231 |
| 2015/0341632 A1* | 11/2015 | Syed | H04N 21/23439 375/240.03 |
| 2016/0255348 A1* | 9/2016 | Panchagnula | H04N 19/196 375/240.02 |
| 2018/0034741 A1* | 2/2018 | Ohnishi | H04L 47/25 |
| 2019/0200053 A1* | 6/2019 | Van Veldhuisen | H04N 21/2662 |
| 2020/0045346 A1* | 2/2020 | Houze | H04N 21/4394 |

OTHER PUBLICATIONS

EP, 201548773.3, Jan. 31, 2020, Adam Eng.
European Search Report issued in related application No. EP20154877.3 dated Apr. 28, 2020.

* cited by examiner

METHODS AND SYSTEMS FOR PROVIDING VARIABLE BITRATE CONTENT

BACKGROUND

Adaptive bitrate systems provide content that transitions between bitrates based on network conditions such as congestion, errors, or the like. A change in bitrate associated with the content may occur at a point in the content where a quality of the content may be negatively impacted by the change in bitrate, such as during an important scene or during a scene transition. A negative impact may include lost video frames, dropped audio, misaligned audio and video, unintentional pauses, and other undesirable effects.

SUMMARY

It is to be understood that both the following general description and the following detailed description are examples and explanatory only and are not restrictive. Methods and systems for providing variable bitrate content are described.

Content (e.g., video content, audio content, multimedia content, etc.) may comprise a plurality of portions (e.g., frames, segments, fragments, etc.). Each portion of the content may be tagged and/or associated with a content element. For example, each portion of the content may be tagged and/or associated with a content element that indicates an encoding complexity associated with the respective portion of the content. Further, an content element may be associated with and/or indicate one or more of metadata associated with the respective portion of the content, attributes of the content (e.g., a scene transition, scene change, etc.) associated with the respective portion of the content, additional content related items (e.g., one or more advertisements, one or more references to related content, etc.) associated with the respective portion of the content, or the like. The content element, based on a user viewing (e.g., accessing, consuming, etc.) the respective portion of the content, may be used to determine a bitrate to associate with the respective portion of the content. The user, based on the content element, may view the respective portion of the content at the bitrate. The content may be transmitted to a network device (e.g., a content player, a media device, a smart device, a mobile device, a computing device, etc.) such that each portion of the content is provided at a bitrate determined (e.g., variable bitrate) based on the content element associated with the respective portion of the content.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, provide examples and together with the description, serve to explain the principles of the methods and systems.

DETAILED DESCRIPTION

Figure 1:
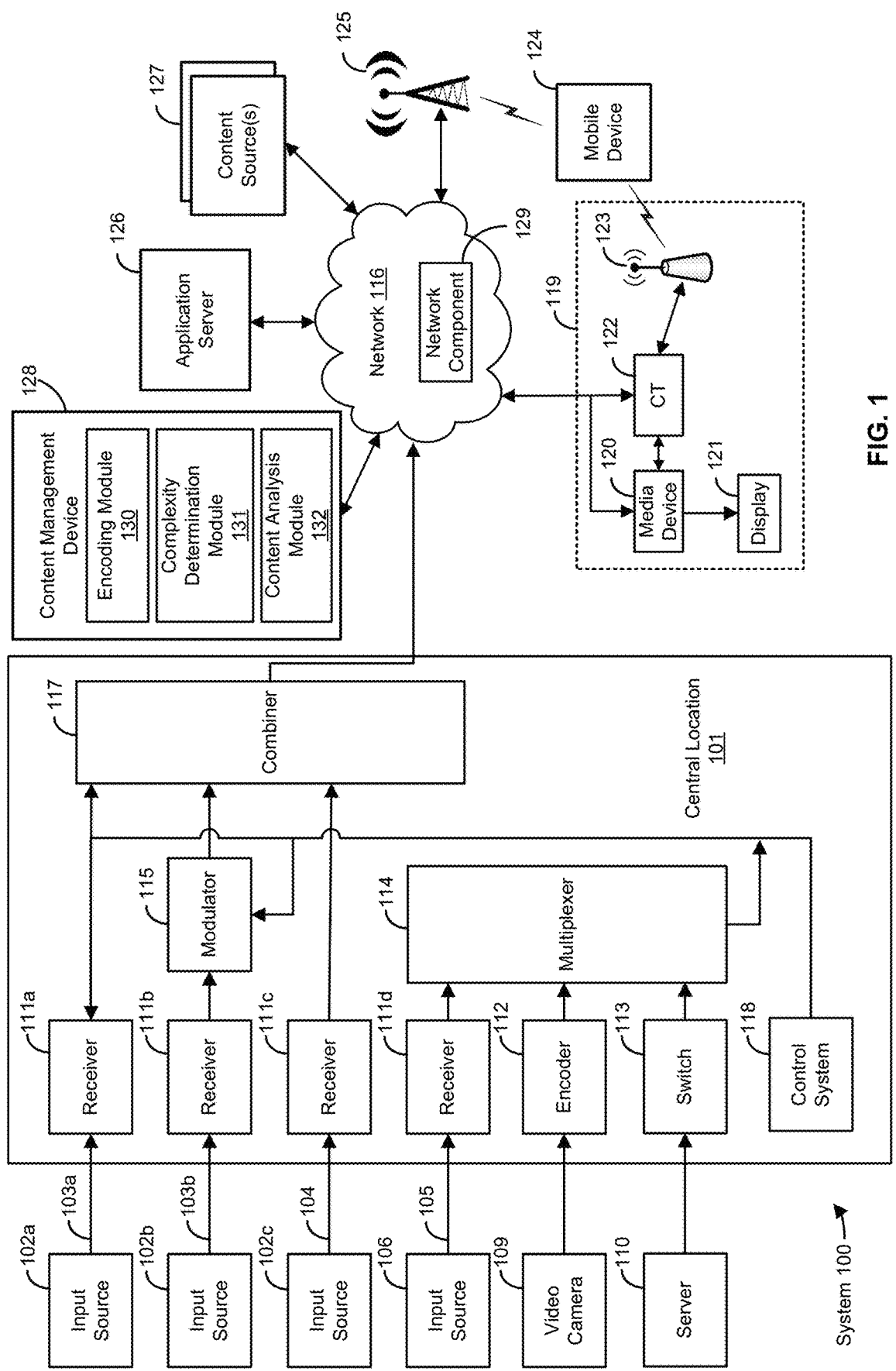
FIG. 1 shows a system for variable bitrate content.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4$k$, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Content (e.g., video content, audio content, multimedia content, etc.) may comprise a plurality of portions (e.g., frames, segments, fragments, etc.). Each portion of the content may be tagged and/or associated with a content element. A content element may be associated with an encoding parameter associated with the respective portion of the content. The encoding parameter may indicate a level of complexity (e.g., low complexity, medium complexity, high complexity, etc.) to encode the respective portion of the content. The level of complexity may be based on one or more of a prediction frame error associated with the respective portion of the content, a relative size of an inter-coded frame of the respective portion of the content with respect to an intra-coded frame of the respective portion of the content, or a number of motion vectors to encode a frame of the respective portion of the content. The level of complexity may be based on and/or determined by an amount of change between a plurality of pixels associated with a previous portion of the content and a corresponding plurality of pixels associated with the respective portion of the content. For example, a level of complexity to encode a portion of content may be low if an amount of change in pixels between the portions of content does not satisfy a threshold, or the level of complexity to encode the portion of content may be high if the amount of change in pixels between the portions of content satisfies or exceeds the threshold.

The content element may be associated with attributes of content (e.g., a scene transition, scene change, etc.) associated with the respective portion of the content. For example, the content element may comprise and/or be associated with metadata that indicates and/or causes a scene transition between a previous portion (or a later portion) of content and the respective portion of the content. As another example, the content element may comprise and/or be associated with metadata that associates the respective portion of the content with one or more advertisements. As another example, the content element may comprise and/or be associated with metadata that associates an audio level with the respective portion of the content.

Each portion of the content (e.g., video content, audio content, multimedia content, etc.) may be tagged and/or associated with a content element that is used to determine (e.g., vary, adapt, etc.) a bitrate for the respective portion of content. The content may be provided to a network device (e.g., a content player, a media device, a smart device, a mobile device, a computing device, etc.) such that each portion of the content is provided at a bitrate determined based on the content element associated with the respective portion of the content.

FIG. 1 shows an example system in which the present methods and systems may operate. Those skilled in the art will appreciate that present methods may be used in systems that employ both digital and analog equipment. One skilled in the art will appreciate that provided herein is a functional description and that the respective functions may be performed by software, hardware, or a combination of software and hardware.

A system 100 may comprise a central location 101 (e.g., a headend, HUB, or a Data Center), which may receive content (e.g., data, input programming, and the like) from multiple sources. The central location 101 may combine the content from the various sources and may distribute the content to user (e.g., subscriber) locations (e.g., location 119) via a network 116.

The central location 101 may receive content from a variety of sources 102a, 102b, 102c. The content may be transmitted from the source to the central location 101 via a variety of transmission paths, including wireless (e.g. satellite paths 103a, 103b) and a terrestrial path 104. The central location 101 may also receive content from a direct feed source 106 via a direct line 105. Other input sources may comprise capture devices such as a video camera 109 or a server 110. The signals provided by the content sources may include a single content item or a multiplex that includes several content items.

The central location 101 may comprise one or a plurality of receivers 111a, 111b, 111c, 111d that are each associated with an input source. For example, MPEG encoders such as an encoder 112, are included for encoding local content or a video camera 109 feed. A switch 113 may provide access to the server 110, which may be a Pay-Per-View server, a data server, an internet router, a network system, a phone system, and the like. Some signals may require additional processing, such as signal multiplexing, prior to being modulated. Such multiplexing may be performed by a multiplexer (mux) 114.

The central location 101 may comprise one or a plurality of modulators 115 for interfacing to the network 116. The modulators 115 may convert the received content into a modulated output signal suitable for transmission over a network 116. The output signals from the modulators 115 may be combined, using equipment such as a combiner 117, for input into the network 116. The network 116 may comprise a content delivery network, a content access network, and/or the like. For example, the network 116 may provide content from a variety of sources using a variety of network paths, protocols, devices, and/or the like. The content delivery network and/or content access network may be managed (e.g., deployed, serviced) by a content provider, a service provider, and/or the like.

A control system 118 may permit a system operator to control and monitor the functions and performance of the system 100. The control system 118 may interface, monitor, and/or control a variety of functions, including, but not limited to, the channel lineup for the television system, billing for each user, conditional access for content distributed to users, and the like. The control system 118 may provide input to the modulators for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

The network 116 may comprise a network component 129. The network component 129 may comprise any device, module, and/or the like communicatively coupled to the network 116. For example, the network component 129 may comprise a router, a switch, a splitter, a packager, a gateway, an encoder, a storage device, a multiplexer, a network access location (e.g., tap), physical link, and/or the like.

A multitude of users may be connected to the network 116 at one or more of the user locations. At the user location 119, a media device 120 may demodulate and/or decode, if needed, the signals for display on a display device 121, such as on a network device, a television set (TV), or a computer monitor. For example, the media device 120 may comprise a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may comprise a network device, a set-top box, a digital streaming device, a gaming device, a media storage device, a digital recording device, a combination thereof, and/or the like. The media device 120 may comprise one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or satellite dish.

The communication terminal 122 may be located at the user location 119. The communication terminal 122 may communicate with the network 116. The communications terminal 122 may comprise a network device, a modem (e.g., cable modem), a router, a gateway, a switch, a network terminal (e.g., optical network unit), and/or the like. The communications terminal 122 may be configured for communication with the network 116 via a variety of protocols, such as internet protocol, DOCSIS protocol, transmission control protocol, file transfer protocol, session initiation protocol, voice over internet protocol, and/or the like. For example, for a cable network, the communication terminal 122 may provide network access via a variety of communication protocols and standards, such as Data Over Cable Service Interface Specification.

The user location 119 may comprise a first access point 123, such as a wireless access point. The first access point 123 may provide one or more wireless networks in at least a portion of the user location 119. The first access point 123 may provide access to the network 116 to devices configured with a compatible wireless radio, such as a mobile device 124, the media device 120, the display device 121, or other computing devices (e.g., laptops, sensor devices, security devices). For example, the first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not be fixed. By way of example, a user may receive content from the network 116 on the mobile device 124. The mobile device 124 may comprise a network device, laptop computer, a tablet device, a computer station, a personal data assistant (PDA), a smart device (e.g., smart phone, smart speaker, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). For example, the mobile device 124 may communicate with a second access point 125. The second access point 125 may be a cell tower, a wireless hotspot, another mobile device, and/or other remote access point. The second access point 125 may be within range of the user location 119 or remote from the user location 119. For example, the second access point 125 may be located along a travel route, within a business or residence, or other useful locations (e.g., travel stop, city center, park).

The system 100 may comprise an application device 126. The application device 126 may be a computing device, such as a server. The application device 126 may provide services related to applications. For example, the application device 126 may comprise an application store. The application store may allow users to purchase, download, install, upgrade, and/or otherwise manage applications. For example, the application device 126 may allow users to download applications to a device, such as the mobile device 124, communications terminal 122, the media device 120, the display device 121, and/or the like. The application device 126 may run one or more application services to provide data, handle requests, and/or otherwise facilitate operation of applications for the user.

The system 100 may comprise one or more content source(s) 127. The content source(s) 127 may provide content (e.g., video, audio, games, applications, data) to the user. The content source(s) 127 may provide streaming media, such as on-demand content (e.g., video on-demand), content recordings, and/or the like. For example, the content source(s) 127 may be managed by third party content providers, service providers, online content providers, over-the-top content providers, and/or the like. The content may be provided via a subscription, by individual item purchase or rental, and/or the like. The content source(s) 127 may provide the content via a packet switched network path, such as via an internet protocol (IP) based connection. The content may be accessed by users via applications, such as mobile applications, television applications, set-top box applications, gaming device applications, and/or the like. An example application may be a custom application (e.g., by content provider, for a specific device), a general content browser (e.g., web browser), an electronic program guide, and/or the like.

The system 100 may comprise a content management device 128. The content management device 128 may provide content, services, and/or the like to a network device. For example, the content management device 128 may be one of a plurality of content management devices distributed across the network 116. The content management device 128 may be located in a region proximate to the user location 119. A request for content from a network device may be directed to the content management device 128 (e.g., due to the location of the content management device and/or network conditions).

The content management device 128 may package content (e.g., video content, audio content, multimedia content, etc.) for delivery to a network device (e.g., in a specific format requested by the network device), provide the network device a manifest file (e.g., or other index file describing portions of the content), provide streaming content (e.g., unicast, multicast), provide a file transfer, and/or the like. To enable faster delivery of content to network devices, the content management device 128 may cache or otherwise store content (e.g., frequently requested content). To enable quality in delivery of content, the content management device 128 may associate content with a content element.

The content management device 128 may associate content and/or portions of content to a bitrate or a plurality of bitrates according to a content element or a plurality of content elements.

Content (e.g., video content, audio content, multimedia content, etc.) may comprise a plurality of portions (e.g., frames, segments, fragments, etc.). The content management device 128 may tag and/or associate each portion of the plurality of portions of the content with a content element of a plurality of content elements. As previously mentioned and later described, a content element may be used to determine a bitrate to associate with a portion of content.

A content element may comprise and/or be associated with an encoding parameter. The encoding parameter may be associated with a portion of a plurality of portions of content. The content management device 128 may comprise an encoding module 130. The encoding module 130 may encode content (e.g., video content, audio content, multimedia content, etc.), such as content provided by the content source(s) 127. The encoding module 130 may comprise one or more encoders configured to receive content (e.g., receive content from the content source(s) 127, etc.) and encode the content. For example, the encoding module 130 may encode each portion of the plurality of portions of the content. As later described, each portion of the plurality of portions of the content may be associated with a bitrate and/or a plurality of bitrates. For example, each portion of the plurality of portions of the content may be associated with a bitrate and/or a plurality of bitrates based on an encoding parameter (e.g., a content element) associated with the respective portion of the content. The encoding module 130 may encode the content into a compressed and/or encrypted format. For example, the encoding module 130 may encode the content into an MPEG stream.

As previously described, content (e.g., video content, audio content, multimedia content, etc.) may comprise a plurality of portions (e.g., frames, segments, fragments, etc.) and the encoding module 130 may encode each portion of the plurality of portions of the content. For example, the encoding module 130 may perform intra-frame and inter-frame encoding (e.g., compression). Intra-frame encoding may comprise encoding a frame of content (e.g., a frame of video) by reference to the frame itself. Inter-frame encoding may comprise compressing a frame a plurality of frames of content, by reference to one or more other frames of the plurality of frames. For example, an intra-coded frame ("I-frame") may comprise a frame of content that is encoded without reference to other frames. A prediction coded frame ("P-frame) may comprise a frame of content encoded with reference to another frame, such as an I-frame. A bi-directionally prediction coded ("B-frame") frame may comprise a frame of content encoded with reference to multiple frames. For example, the encoding module 130 may encode a content stream into a plurality of I-frames, P-frames, and B-frames. The plurality of I-frames, P-frames, and B-frames may be organized into groups, each group known as a group of frames and/or group of pictures (GOP).

To encode a frame of content (e.g., video content, audio content, multimedia content, etc.) with reference to another frame, the encoding module 130 may determine/encode one or more motion vectors configured to correlate a portion of the encoded frame to a portion of a referenced frame. The one or more motion vectors may indicate a difference in location between one or more pixels of the encoded frame and one or more corresponding (e.g., identical, similar, etc.) pixels in the reference frame. A motion vector may comprise, for example, a direction and distance between two points in a coordinate system. As another example, a motion vector may comprise a coordinate in a reference frame and a coordinate in the encoded frame. The encoding module 130 may encode an I-frame by encoding all the pixels in a frame. The encoding module 130 may encode P-frames and/or B-frames without encoding all of the pixels in a frame. The encoding module 130 may encode motion vectors that associate (e.g., correlate) portions (e.g., pixels) of a reference frame and the location thereof with portions of an encoded frame and the location thereof. The encoding module 130 may determine prediction errors associated with encoding a frame and/or a plurality of frames. For example, if a portion of a reference frame identified by a motion vector is not identical to the associated portion of the frame being encoded, the encoding module 130 may determine/identify differences (e.g., prediction errors) between the portion of the reference frame referenced by the motion vectors and the portion of the frame being encoded. An encoding parameter may be based on a number of motion vectors used by the encoding module 130 to encode a frame of content. For example, the encoding module 130 may use motion vectors to correlate a location of a portion of a reference frame to a portion of a frame being encoded.

Additionally, the encoding module 130 may perform one or more transformation algorithms on content (e.g., video content, audio content, multimedia content, etc.). For example, the encoding module 130 may perform a discrete cosine transform (or any other transformation) on the content and/or a portion of a plurality of portions of the content. A transformation algorithm may comprise expressing the content as a summation of functions (e.g., a summation of cosine functions). The functions may be related according to a formula. For example, each function may be raised to exponents, multiplied by coefficients, and/or provided arguments based on a summation formula. At least a portion of the plurality of portions of the content may be transformed according to a transformation algorithm. The coefficients of the functions resulting from the transformation algorithm may be encoded and provided as encoded content. For example, the encoding module 130 may encode only a portion of the coefficients resulting from the transformation algorithm.

The encoding module 130 may quantize content (e.g., video content, audio content, multimedia content, etc.) and/or encoded data indicating the content (e.g., coefficients resulting from a transformation algorithm). Quantization may comprise converting content and/or encoded data into a smaller set of content and/or encoded data. For example, the coefficients may comprise an integer (e.g., 299792458) and/or a non-integer (e.g., 1.618033) real number. The encoding module 130 may quantize a coefficient by truncating, rounding, or otherwise reducing the number of digits in a number. For example, the example coefficient 1.618033 may be quantized to 1.618. The amount of quantization may be based on a quantization step size. A smaller quantization step size may result in the loss of less data than a larger quantization step size. For example, a larger quantization step size may result in a quantized coefficient of 1.61 and a smaller quantization step size may result in a quantized coefficient of 1.61803.

An encoding parameter may comprise an encoding quantization level. The encoding quantization level may be based on the number of coefficients encoded from the transformation algorithm. For example, the encoding quantization level may be a measurement of the number of coefficients encoded for one or more frames (e.g., a plurality of images, a group of pictures, etc.) of encoded content. For example, the transformation algorithm may assign a coefficient to a number of values within range of a coefficient (e.g., coefficients of 1.1 and 0.9 could be represented as 1). Such ranges may be considered as quantization buckets or bins. The quantization level may be indicative of a number of pixel values assigned to a coefficient. The encoding parameter may comprise a number value indicating the quantization level (e.g. for a frame or group of frames). The encoding parameter may also comprise an average of the number values indicating the quantization level, an evaluation (e.g., high, medium, low) of the number value indicating a quantization level with respect to a threshold, and/or the like. For example, the quantization levels may be categorized as high, medium, or low based on the size of the ranges of coefficients (e.g., quantization buckets or bins) used in a transformation algorithm. The quantization levels may be categorized as high, medium, or low based on comparison of the ranges of the coefficients to average sizes of the ranges of coefficients. The quantization levels may be categorized as high, medium, or low based on the percentage of coefficients that reside in a dead zone. For example, a dead zone may be a range of values around a zero-output region of the quantization algorithm.

An encoding parameter may comprise information based on one or more prediction errors determined by the encoding module 130 when encoding inter-coded frames, such as P-frames or B-frames. For example, a prediction error may comprise a measurement of differences between references frames and encoded frames. A prediction error may comprise a difference between pixel values (e.g., 0 through 255) of a reference frame as compared to a decoded frame. The encoding parameter may indicate a number of times the encoding module 130 determines/generates prediction errors when encoding one or more frames/portions (e.g., in a group of pictures) of content. For example, the encoding module 130 may determine/generate a prediction error when mapping one or more portions (e.g., pixels) of the reference frame of content to one or more portions of a frame (e.g. pixels) of the content being encoded. The encoding parameter may comprise a number of prediction errors (e.g., for one or more pixels, groups of pixels, frames, groups of frames, etc.), an average of the number of prediction errors, an evaluation (e.g., low, medium, high, etc.) of the number of prediction errors with respect to a threshold, and the like.

A prediction error may be normalized against each candidate frame from a group of frames of content to be encoded. The encoding module 130 may determine low, medium, and high values based on a comparison to standard deviations from a norm (e.g., mean or average value). For example, a prediction error may be considered low if the prediction error is below one standard deviation from the norm. A prediction error may be considered medium if the prediction error is within one standard deviation from the norm. A prediction error may be considered high if the prediction error is above one standard deviation from the norm.

An encoding parameter may comprise a quantizing step size. The quantization step size may comprise a measure of the amount of information stored in each coefficient generated by a transformation operation. For example, the measurement may indicate a number of digits of the coefficient retained after the coefficients are truncated, rounded, or otherwise reduced. For example, a determined coefficient 1.618033 may be reduced in data size. A reduction to 1.6 may be indicated by a larger quantization step size than a reduction to 1.618. An encoding parameter may comprise one or more quantization step sizes determined by the encoding module 130, an average of quantization step sizes determined by the encoding module 130, an evaluation (e.g., low, medium, high) of values determined by the encoding module 130 with respect to a threshold, and/or the like. For example, the encoding module may determine a quantization step size as high, medium, or low based on comparison to an average quantization step size.

An encoding parameter may comprise a comparison of an inter-coded frame to an intra-coded frame. For example, the encoding module 130 may compare the size (e.g., data storage size) of the intra-coded frame to the size of an inter-coded frame. An I-frame may be compared to one or more P-frames and/or B-frames. The size of the I-frame may be compared to the size of one or more P-frames and/or B-frames. For example, the size may be based on a number of bytes of the frame. An encoding parameter may comprise and/or be based on a comparison (e.g., the size of the difference) of intra-coded frame to more than one inter-coded frames. For example, an encoding parameter may be an average of comparisons for a group of frames of a plurality of frames (e.g., a plurality of portions of content, etc.). The encoding parameter may also comprise a value determined by the encoding module 130 by evaluating the comparison with respect to a threshold. For example, the encoding module 130 may determine the comparison of the intra-coded frame to the inter-coded frame to be low, medium, high, or the like. For example, B or P frames that are 0.4 the size of an I-frame or less may be considered low, values between 0.4 and 0.6 may be medium, and values above 0.6 may be considered high. The encoding module 130 may determine the ratios indirectly. For example, the number of prediction errors generated by the encoding module 130 in predicting/determining the P and B frames with motion vectors may be indicative of a higher relative size of the P and B frames compared to the I-frame.

The content management device 128 (e.g., the encoding module 130) may encode content and/or portions of a plurality of portions of the content (e.g., video content, audio content, multimedia content, etc.) by any method. An encoding parameter may indicate a level of complexity (e.g., low complexity, medium complexity, high complexity, etc.) to encode a portion of a plurality of portions of content (e.g., video content, audio content, multimedia content, etc.). The content management device 128 may comprise a complexity determination module 131. The complexity determination module 131 may determine a level of complexity required to encode content. An encoding parameter may comprise/indicate a level of complexity to encode a portion of a plurality of portions of content that is determined by the complexity determination module 131.

The complexity determination module 131 may determine a level of complexity required for the encoding module 130 to encode content (e.g., video content, audio content, multimedia content, etc.) and/or a portion (e.g., a frame) of a plurality of portions (e.g., frames) of the content. For example, the complexity determination module 131 may determine one or more encoding parameters indicative of a level of complexity to encode content. An encoding parameter may comprise a complexity value related to an operation performed (e.g., performed by the encoding module 130, etc.) in encoding the content. The complexity value may be a measurement of a number of aspects (e.g., calculations, values, groupings, averages) of an operation performed by the encoding module 130 and/or results of the operation. For example, the level of complexity may be based on one or more of a prediction frame error associated with a portion (e.g., a frame) of content, a relative size of an inter-coded frame of the portion of the content with respect to an intra-coded frame of the portion of the content, or a number of motion vectors used by the encoding module 130 to encode a frame of the content. The complexity value may indicate a relative complexity (e.g., low complexity, medium complexity, high complexity, etc.) to the operation performed on other content.

The complexity determination module 131 may determine a level of complexity required for the encoding module 130 to encode content (e.g., video content, audio content, multimedia content, etc.) and/or a portion (e.g., a frame) of a plurality of portions (e.g., frames) of the content by determining (e.g., counting) a number of motion vectors used by the encoding module 130 to encode a frame (and/or a group of frames) of a plurality of frames of content. The complexity determination module 131 may measure a size of one or more motion vectors of a frame (e.g., a portion) of content encoded by the encoding module 130. For example, the complexity determination module 131 may calculate a distance between a portion of a reference frame and a portion of an encoded frame associated by a motion vector. The complexity determination module 131 may determine the distance by performing one or more calculations, such as: an absolute value operation, a magnitude operation, determining subcomponents of the motion vector, calculating a motion vector length based on Pythagorean's theorem, calculating the value of a trigonometric function (e.g., sine, cosine, tangent, cotangent), determining the difference between a coordinate at a point in the reference frame from a coordinate at a point in the encoded frame, and the like. The encoding parameter may comprise one or more determined values (e.g., number of motion vectors, length of motion vectors), an average of determined values, an evaluation (e.g., low, medium, high) of determined values with respect to a threshold, and/or the like. For example, motion vector values may be determined as high, medium, based on a comparison to an average (e.g., real-time average) distance of movement indicated by the motion vectors.

The complexity determination module 131 may determine a level of complexity required for the encoding module 130 to encode content (e.g., video content, audio content, multimedia content, etc.) and/or a portion (e.g., a frame) of a plurality of portions (e.g., frames) of the content by any method. For example, the complexity determination module 131 may determine a level of complexity required for the encoding module 130 to encode content and/or a portion (e.g., a frame) of a plurality of portions (e.g., frames) of the content by determining by an amount of change between a plurality of pixels associated with a previous portion of the content and a corresponding plurality of pixels associated with a portion of the content. For example, a level of complexity to encode (e.g., for the encoding module 130 to encode) a portion of content may be a low level of complexity if an amount of change in pixels between the portions of the content does not satisfy a threshold, or the level of complexity to encode (e.g., for the encoding module 130 to encode) the portion of content may be a high level of complexity if the amount of change in pixels between the portions of content satisfies or exceeds the threshold.

As previously described, content (e.g., video content, audio content, multimedia content, etc.) may comprise a plurality of portions (e.g., frames, segments, fragments, etc.). The content management device 128 may tag and/or associate each portion of the plurality of portions of the content with a content element of a plurality of content elements. A content element may be associated with attributes of content. The content management device 128 may comprise a content analysis module 132. The content analysis module 132 may determine one or more attributes of content. For example, the content analysis module 132 may determine an attribute for each portion of a plurality of portions of content. An attribute of a portion of content may be and/or be associated with (e.g., indicate) a scene transition (e.g., scene change) between the portion of the content (e.g., a frame of the content) and another portion of the content (e.g., another frame of the content).

The content analysis module 132 may determine a scene transition (e.g., a scene change) between a portion of content (e.g., a frame of content) and another portion of the content (e.g., another frame of the content). The content analysis module 132 may determine a luminance value for a plurality of pixels associated with a previous portion (or post portion) of the content and a luminance value for a corresponding plurality of pixels associated with a portion of the content. For example, the content analysis module 132 may determine a plurality of luminance values associated with a plurality of pixels of a previous frame (or post frame) of content by determining a luminance value for each pixel of the plurality of pixels. The content analysis module 132 may determine a total luminance value associated with the previous frame (or post frame) of the content based on the plurality of luminance values associated with the plurality of pixels of the previous frame (or post frame) of the content. For example, the total luminance value may be a sum, average, or any other collective value of the plurality of luminance values associated with the plurality of pixels of the previous frame (or post frame) of the content. The content analysis module 132 may determine a total luminance value associated with a frame (e.g., a current frame) of the content by the same method described for determining the total luminance value associated with the previous (or post) frame.

The content analysis module 132 may determine a scene transition (e.g., a scene change) between a portion of content (e.g., a frame of content) and another portion of the content (e.g., another frame of the content) by comparing a total luminance value associated with the portion of the content to a total luminance value associated with the other portion of the content (e.g., other frame of the content, previous frame of the content, post frame of the content, etc.). A difference in total luminance value may indicate a change from a full color scene of the content, to a black scene of the content. A scene transition associated with the content (e.g., portion of the content) may be indicated by the presence of a black screen. The content analysis module 132 may determine that a scene associated with the content is not transitioning if the total luminance value associated with the portion of the content is the same value, or if a difference between the total luminance values does not satisfy a threshold (e.g., the threshold may not be satisfied if the difference between the total luminance values is less than a value, such as of 2). The content analysis module 132 may determine that a scene associated with the content is transitioning if the total luminance value associated with the portion of the content is the different, or if a difference between the total luminance values satisfies or exceeds the threshold (e.g., the threshold may be satisfied if the difference between the total luminance values is equal to or greater than a value, such as a value of 2).

The content analysis module 132 may use any method to determine a scene transition (e.g., a scene change) between a portion of content (e.g., a frame of content) and another portion of the content (e.g., another frame of the content). A scene transition may be indicated by a portion of content comprising and/or being associated with dialog and a previous or post portion of the content not comprising and/or being associated with dialog. The content analysis module 132 may determine whether a portion of content comprises and/or is associated with dialog by determining/analyzing closed captions (e.g., closed captioning data, metadata, etc.) associated with the content. For example, the content analysis module 132 may determine a scene transition associated with content based on closed captions (e.g., closed captioning data, metadata, etc.) associated with a previous (or post) portion of the content and a closed captions associated with a portion (e.g., current portion) of the content. For example, the content analysis module 132 may analyze attributes (e.g., metadata, associated files, etc.) of each portion of a plurality of portions of content and determine whether a respective portion of the content comprises and/or is associated with closed captions. The content analysis module 132 may determine a scene transition (e.g., a scene change) between portions of the content by determining whether consecutive portions of the content comprise and/or are associated with closed captions. For example, a scene transition may be indicated by a previous (or post) portion of content comprising and/or being associated with closed captions (e.g., closed captioning data, metadata, etc.) and a portion of the content (e.g., a current portion of the content) not comprising and/or not being associated with closed captions.

The content analysis module 132 may use any method to determine a scene transition (e.g., a scene change) between a portion of content (e.g., a frame of content) and another portion of the content (e.g., another frame of the content). A scene transition may be indicated by a portion of content comprising and/or being associated with an audio level (e.g., sound level) and a previous or post portion of the content comprising and/or being associated with a different audio level (e.g., sound level). The difference between audio levels may be based on a threshold. The content analysis module 132 may determine that a scene transition does not occur between portions of content if a difference between respective audio levels associated with the portions of the content does not satisfy a threshold. The content analysis module 132 may determine that a scene transition occurs between portions of content if a difference between respective audio levels associated with the portions of the content satisfy or exceed the threshold.

The content analysis module 132 may determine additional content related items (e.g., one or more advertisements, one or more references to related content, etc.) associated with content. The content analysis module 132 may determine additional content related items associated with a portion of a plurality of portions of content (e.g., video content, audio content, multimedia content, etc.). For example, the content analysis module 132 may determine that a portion of content is associated with an advertisement (e.g., a portion of an advertisement, a beginning of an advertisement, an end of an advertisement, etc.). The content analysis module 132 may determine that the portion of the content is associated with the advertisement (e.g., a portion of the advertisement, a beginning of the advertisement, an end of the advertisement, etc.) based on metadata or any other indicator (e.g., a watermark, a resource location, etc.) of the advertisement.

As previously mentioned, the content management device 128 may tag and/or associate each portion of a plurality of portions of content (e.g., video content, audio content, multimedia content, etc.) with a content element of a plurality of content elements. As described, a content element may be associated with and/or indicate one or more of an encoding parameter (e.g., a level of complexity to encode, etc.) associated with the respective portion of the content, attributes of content (e.g., a scene transition, scene change, etc.) associated with the respective portion of the content, additional content related items (e.g., one or more advertisements, one or more references to related content, etc.) associated with the respective portion of the content, or the like. The content management device 128 may use a content element determine a bitrate to associate with a portion of content.

The content management device 128 may package content (e.g., video content, audio content, multimedia content, etc.) for delivery to a network device (e.g., a content player, a media device, a smart device, a mobile device, a computing device, etc.). The content management device 128 may associate content with a content element to enable quality consumption of the content. For example, quality (e.g., picture quality, sound quality, visual quality, etc.) consumption of content may be content that may be consumed (e.g., displayed, watched, listened to, etc.) without perceived changes in video quality (e.g., no image artifacts, no blurred images, no unintentionally paused and/or delayed video, etc.), audio quality (e.g., no unintentional changes in volume, no changes in sound clarity, etc.), and or the like. The content management device 128 may use a plurality of content elements to determine a plurality of bitrates to associate with a plurality of portions of content such that each portion of the plurality of portions of the content is associated with a content element and one or more bitrates, such as a low bitrate, a medium bitrate, a high bitrate, or the like. The content management device 128 may determine that any bitrate is a low bitrate, a medium bitrate, or a high bitrate. The content management device 128 may determine that any bitrate is a low bitrate, a medium bitrate, or a high bitrate by any method, such as based on network (e.g., the network 116, etc.) conditions (e.g., latency in a portion/channel of the network, network congestion, provisioned information and/or data transfer rates, etc.), user determined bitrate classifications (e.g., user defined bitrate ranges from high to low, etc.), dynamically determined bitrate classifications, or the like. The content management device 128 may associate any bitrate and/or plurality of bitrates to any portion of content based on a content element associated with the portion of the content.

The content management device 128 may associate a bitrate and/or a plurality of bitrates to a portion of a plurality of portions of content based on an associated level of complexity to encode the portion of the content (as indicated by an associated content element). For example, an impact on a quality of consumption (e.g., picture quality, sound quality, visual quality, etc.) of a portion of content may be caused by network congestion (or any other cause) and may result in image artifacts, blurred images, illegible sound, paused/frozen content, and the like associated with a portion of content. A low level of complexity to encode a portion of content may indicate that the portion of the content may be provided to a network device (e.g., a content player, a media device, a smart device, a mobile device, a computing device, etc.) at a low bitrate because a quality of consumption (e.g., picture quality, sound quality, visual quality, etc.) of the portion of content by the network device (a user of the network device) will not be impacted (e.g., will not be substantially impacted, will be minimally impacted, etc.) by the low bitrate. The content management device 128 may determine that an encoding parameter associated/indicated by a content element indicates that a portion of content is associated with a level of complexity (e.g., a low level of complexity, a medium level of complexity, a high level of complexity, etc.) to encode (e.g., encoded by the encoding module 130 and/or any other device) the portion of the content. The content management device 128 may associate a low bitrate and/or a plurality of low bitrates to a portion of content associated with a content element (e.g., encoding parameter) that indicates a low level of complexity to encode the portion of the content. A high level of complexity to encode a portion of content may indicate that the portion of the content should be provided to a network device at a high bitrate because a quality of consumption (e.g., picture quality, sound quality, visual quality, etc.) of the portion of content by the network device (a user of the network device) will be impacted if the portion of the content is not provided and/or consumed at a high bitrate. The content management device 128 may associate a high bitrate and/or a plurality of high bitrates to a portion of content associated with a content element (e.g., encoding parameter) that indicates a high level of complexity to encode the portion of the content. The content management device 128 may associate any bitrate and/or plurality of bitrates to any portion of content based on a content element associated with the portion of the content.

The content management device 128 may associate a bitrate and/or a plurality of bitrates to each portion of a plurality of portions of content based on attributes (e.g., a scene transition, a scene change, etc.) of the content associated with the respective portion of the content and indicated by a content element. For example, the content management device 128 may associate a low bitrate and/or a plurality of low bitrates to a portion of content associated with a content element that indicates a scene transition (e.g. scene change, etc.) associated with the portion of the content. A quality of consumption associated with the portion of the content may not (will not) be perceived as impacted (e.g., visually/audibly detected by a user consuming the portion of the content) by a low bitrate because a scene transition may be associated with a visually black screen, a lack of dialog/audio, or the like occurring at the point (e.g., portion of content) of the scene transition. The content management device 128 may associate a medium/high bitrate and/or a plurality of medium/high bitrates with portions of content associated with a content element that indicates a scene transition (e.g. scene change, etc.) associated with the portions of the content does not occur. A scene transition that does not occur during a portion of content may be an indication (e.g., indicated by an associated content element, etc.) that the portion of content is associated with an important scene of the content, such as a scene/portion of the content where a quality of consumption associated with the scene/portion will be perceived as impacted if the scene/portion of the content is consumed at a low bitrate. The content management device 128 may associate any bitrate and/or plurality of bitrates to any portion of content based on a content element associated with the portion of the content.

The content management device 128 may associate a bitrate and/or a plurality of bitrates to each portion of a plurality of portions of content based on additional content related items (e.g., one or more advertisements, one or more references to related content, etc.) associated with a respective portion of the content and indicated by a content element. For example, the content management device 128 may associate a bitrate (e.g., a low bitrate, a medium bitrate, a high bitrate, etc.) and/or a plurality of bitrates to a portion of content associated with a content element that indicates that an advertisement (e.g., a portion(s) of an advertisement, an advertisement segment, an advertisement spot, etc.) is associated with the portion of the content. The advertisement may be associated with the portion of the content based on metadata associated with the advertisement (e.g., a portion(s) of an advertisement, an advertisement segment, an advertisement spot, etc.) and/or the portion of the content. The content management device 128 may associate any bitrate and/or any plurality of bitrates with portions of content associated with a content element that indicates that an advertisement (e.g., a portion(s) of an advertisement, an advertisement segment, an advertisement spot, etc.) is associated with the portion of the content.

The content management device 128 may store content and/or provide the content to storage (e.g., a database, a cloud-based storage, etc.). The content management device 128 may store the content and/or provide the content to storage such that each portion of the content is stored with a content element and at a bitrate and/or a plurality of bitrates determined based on the content element.

The content management device 128 may provide content to a network device (e.g., a content player, the media device 120, a smart device, the mobile device 124, a computing device, etc.). The content management device 128 may provide the content to the network device based on a request for the content. The content management device 128 may provide the content to the network device such that each portion of the content is provided with a content element and/or at a bitrate and/or a plurality of bitrates determined based on the content element. The content may be provided to the network device and/or any other device as streaming content, downloaded content, referenced and retrieved content, or the like. The content management device 128 may provide the content in a form comprising, an index file, a multimedia file, a text file, code, a script, metadata, resource location(s), combinations thereof, or the like. For example, the content management device 128 may provide the content to the network device and/or any other device as a manifest file comprising a plurality of references to the content. The content management device 128 may provide the content to the network device and/or any other device as a manifest file comprising a plurality of content elements and a plurality of references to the content such that each portion of the content is associated with a bitrate and/or a plurality of bitrates determined based on a content element of the plurality of content elements. The content management device 128 may provide the content to the network device and/or any other device by any method. The network device and/or any other device may retrieve/receive the content by any method.

In an aspect, the content management device 128 may associate a bitrate and/or a plurality of bitrates to a portion of a plurality of portions of content based on consumption of the content (e.g., access/retrieval of the content, display of the content, etc.). For example, the content management device 128 may associate a bitrate and/or a plurality of bitrates to a portion of a plurality of portions of content based on an amount of network devices (e.g., content players, the media device 120, smart devices, the mobile device 124, computing devices, the display device 121, etc.) accessing a portion of a plurality of portions of content, an amount of network devices displaying a portion of a plurality of portions of content, and/or an amount of network devices requesting a portion of a plurality of portions of content. The content management device 128 may associate a low bitrate and/or a plurality of low bitrates to a portion of content that is associated with consumption that does not satisfy a threshold. The content management device 128 may associate a high bitrate and/or a plurality of high bitrates to a portion of content that is associated with consumption that satisfies and/or exceeds a threshold. The content management device 128 may associate any bitrate and/or plurality of bitrates to any portion of content based on any level (e.g., threshold level, etc.) of consumption of the respective portion of the content.

In an aspect, the content management device 128 can, based on consumption of content (e.g., access/retrieval of the content, display of the content, etc.), use a content element associated with a portion of a plurality of portions of the content to associate a bitrate and/or a plurality of bitrates to the portion of the plurality of portions of content. For example, the content management device 128 may determine consumption of a portion of the plurality of portions of content. The content management device 128 may determine that a content element associated with the portion of the content and/or a previous/post portion of the content indicates a scene transition (e.g. scene change, etc.) and associate a high bitrate (or a low bitrate) and/or a plurality of high bitrates (or a plurality of low bitrates) with the portion of the content and/or a previous/post portion of the content so bitrate change in not perceived (e.g., content provided in a best possible quality, etc.) by a user(s) of a network device(s) associated with the consumption. In an aspect, the content management device 128 may associate a bitrate and/or a plurality of bitrates to a portion of a plurality of portions of content based on attributes associated with a content delivery network (e.g., the network 116, etc.), such as network latency/congestion, bandwidth parameters/availability, and/or the like. For example, the content management device 128 may associate a bitrate and/or a plurality of bitrates to a portion of a plurality of portions of content based on an amount of bandwidth available in a network, determined latency/congestion in the network, and/or network parameters (e.g., a committed information rate, etc.) when a portion of a plurality of portions of content is access, requested, retrieved, and/or the like by a network device (e.g., a content player, the media device 120, a smart device, the mobile device 124, a computing device, etc.) and/or any other device. In an aspect, the content management device 128 may associate a bitrate and/or a plurality of bitrates to each portion of a plurality of portions of content based on any factor and/or determination by the content management device 128, a network device, and/or any other device.

A network device (e.g., a content player, the media device 120, a smart device, the mobile device 124, a computing device, etc.) and/or any other device may consume content and/or portions of the content in a best possible quality (e.g., based on a best possible bitrate, etc.) according to a plurality of content elements associated with the content (e.g., a plurality of portions of the content). The best possible quality may be a quality (e.g., picture quality, sound quality, visual quality, etc.) of the content with image artifacts, blurred images, illegible sound, paused/frozen content, or the like reduced and/or negligible. To ensure that the each portion of the plurality of portions of the content is consumed at the best quality, the network device may determine/select a bitrate of a plurality of bitrates based on respective content element of the plurality of content elements associated with each portion of the plurality of portions of the content. The network device may use a content element associated with a portion of content to determine/select a bitrate of the plurality of bitrates associated with the content that will enable the content to be consumed at the best quality. For example, if a network device (or a user associated with the network device) is consuming content, the network device may automatically select/adjust a bitrate associated with a portion of the content because a content element indicates that the quality of consumption will not be impacted by a selection/adjustment of a bitrate, such as an selection/adjustment to a lower bitrate, or a higher bitrate compared to a bitrate at which other portions of the content are/can be consumed.

Figure 2:
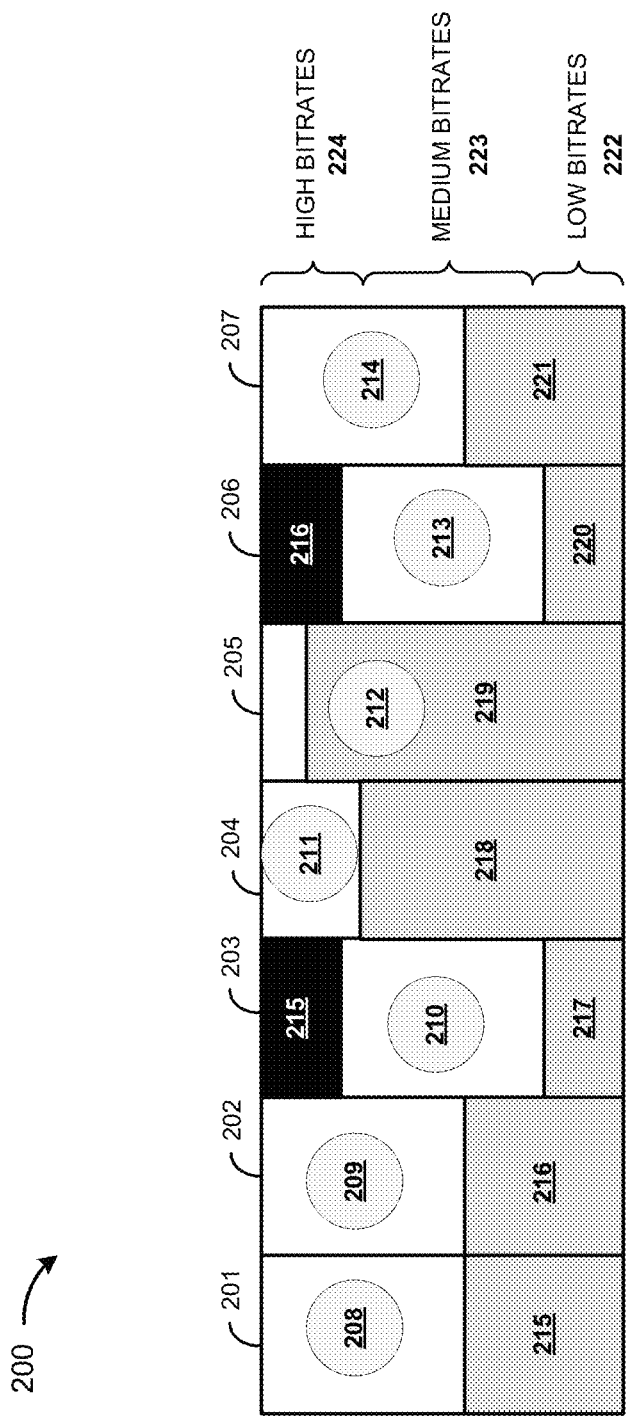
FIG. 2 shows a diagram for variable bitrate content.

FIG. 2 is a diagram of variable bitrate content. The content 200 may be video content, audio content, multimedia content, or any other type of content. The content 200 may comprise portions 201, 202, 203, 204, 205, 206, 207. The portions 201, 202, 203, 204, 205, 206, 207 may be frames, segments, fragments, or the like of the content 200. Each of the portions 201, 202, 203, 204, 205, 206, 207 may be based on and/or associated with an interval (e.g., 2-second interval, etc.) of the content 200.

The content 200 may comprise a plurality of content elements 208, 209, 210, 211, 212, 213, 214. Each of the content elements 208, 209, 210, 211, 212, 213, 214 may be associated with and/or indicate an encoding parameter associated with the respective portions 201, 202, 203, 204, 205, 206, 207 of the content 200. For example, the content element 208 may be associated with and/or indicate an encoding parameter associated with the portion 201 of the content 200, the content element 209 may be associated with and/or indicate an encoding parameter associated with the portion 202 of the content 200, and so on. An encoding parameter associated with a content portion may be based on and/or indicate a level of complexity to encode the content portion. A level of complexity to encode a content portion may be indicated, for example, as a low complexity, a medium complexity, a high complexity, and/or the like.

A level of complexity associated with each content portion 201, 202, 203, 204, 205, 206, 207 may be based on a prediction frame error associated with the respective content portion during encoding and/or compression of the content 200. For example, the content 200 may comprise intra-coded frames (I-frames). I-frames can, during encoding/compression, be processed independent from frames that precede and/or come after them. Any of the content portions 201, 202, 203, 204, 205, 206, 207 may be an intra-coded frame (I-frame). An I-frame may contain/store all information/data necessary to display the frame (e.g., the content portions 201, 202, 203, 204, 205, 206, 207, etc.). The content 200 may comprise predictive frames (P-frames). Any of the content portions 201, 202, 203, 204, 205, 206, 207 may be a P-frame. P-frames may follow I-frames and be encoded with and/or comprise information/data of any content changes from the preceding I-frame (e.g., a change in color, a change in content, etc.). A prediction frame error may generated based on a predicted (e.g., expected, etc.) measurement of difference between a reference frame (e.g., I-frame, etc.) and an encoded frame (e.g., P-frame, etc.) failing to coincide with an actual measurement of difference between the reference frame (e.g., I-frame, etc.) and the encoded frame (e.g., P-frame, etc.). A prediction error may be based on a difference between pixel values (e.g., 0 through 255) of an I-frame and pixel values of an encoded frame (P-frame, etc.). For example, if content portion 201 is an I-frame and content portion 202 is a P-frame, and during encoding of the content portion 202, an amount of change in color (e.g., pixel color, etc. . . . ) does not coincide with a predicted amount of change in color, then a prediction frame error may be generated. An encoding parameter associated with a content portion (e.g., the content portions 201, 202, 203, 204, 205, 206, 207, etc.) may comprise a number of prediction errors (e.g., for one or more pixels, groups of pixels, frames, groups of frames, etc.), an average of the number of prediction errors, an evaluation (e.g., low, medium, high, etc.) of the number of prediction errors with respect to a threshold, and the like. A level of complexity associated with a content portion (e.g., a frame of content, the content portions 201, 202, 203, 204, 205, 206, 207, etc.) may be based on an amount of prediction frame errors associated with the frame. For example, a content portion with an amount of prediction frame errors below a threshold amount of prediction frame errors may be associated with a low level of complexity, a content portion with an amount of prediction frame errors equaling the threshold amount of prediction frame errors may be associated with a medium level of complexity, and a content portion with an amount of prediction frame errors exceeding the threshold amount of prediction frame errors may be associated with a high level of complexity.

A level of complexity associated with each content portion 201, 202, 203, 204, 205, 206, 207 may be based on a number of motion vectors associated with a frame of the respective content portion. For example, each content portion 201, 202, 203, 204, 205, 206, 207 may comprise inter-coded frames and intra-coded frames. An inter-coded frame may be divided into blocks known as macroblocks (e.g., MCU blocks, H.261, MPEG-1 Part 2, H.262/MPEG-2 Part 2, H.263, MPEG-4 Part 2, and H.264/MPEG-4 AVC, etc.). Macroblocks may be processing units used during encoding/compression according to linear block transforms, such as a discrete cosine transform (DCT), for example. A macroblock may consists of 16×16 samples, may be subdivided into transform blocks, and may be further subdivided into prediction blocks. After that, instead of directly encoding the raw pixel values for each block, the encoder will try to find a block similar to the one it is encoding on a previously encoded frame, referred to as a reference frame. This process is done by a block matching algorithm. If the encoder succeeds on its search, the block could be encoded by a vector, known as motion vector, which points to the position of the matching block at the reference frame. The process of motion vector determination is called motion estimation.

The level of complexity may be based on and/or determined by an amount of change between a plurality of pixels associated with a previous portion of the content 200 and a corresponding plurality of pixels associated with the respective portion of the content 200. For example, a level of complexity to encode a portion of content 200 may be low if an amount of change in pixels between the portions of content 200 does not satisfy a threshold, or the level of complexity to encode the portion of content may be high if the amount of change in pixels between the portions of content satisfies or exceeds the threshold. An amount of change in pixels between the portions of content 200 that does not satisfy a threshold may indicate that the respective portion of the content is not complex, is associated with a scene-transition and/or black screen, is associated with one or more advertisements, and/or the like. An amount of change in pixels between the portions of content 200 that satisfy a threshold may indicate that the respective portion of the content is complex, contains detailed images, contains enhanced audio attributes, is associated with a quantity of items/objects that may be displayed, and/or any other attribute of the content.

A level of complexity associated with a content portion may be based on a relative size of an inter-coded frame with respect to an intra-coded frame. An inter-coded frame may be a frame of content that has been encoded/compressed based on data (e.g., metadata, pixel orientation, pixel luminance, etc.) from many frames immediately preceding or succeeding the respective frame. An intra-coded frame may be a frame of content that has been encoded/compressed without regard/reference to other frames of the content. Any of the content portions 201, 202, 203, 204, 205, 206, 207 may be an inter-coded frame. Any of the content portions 201, 202, 203, 204, 205, 206, 207 may be an intra-coded frame. For example, the content portion 202 may be an inter-coded frame, and the content portion 203 may be an intra-coded frame. A level of complexity associated with the content portion 202 may be based on a relative size of the content portion 202 with respect to the content portion 203. Any of the content portions 201, 202, 203, 204, 205, 206, 207 may be an inter-coded frame. Any of the content portions 201, 202, 203, 204, 205, 206, 207 may be an intra-coded frame.

Each content element 208, 209, 210, 211, 212, 213, 214 may be used to determine a bitrate (e.g., a low bitrate, a medium bitrate, a high bitrate, etc.) or a plurality of bitrates (e.g., a range of low bitrates, a range of medium bitrates, a range of high bitrates, etc.) to associate each of the portions 201, 202, 203, 204, 205, 206, 207 of the content 200.

The content elements 208, 209, 210, 211, 212, 213, 214 may be associated with attributes of content 200 (e.g., a scene transition, scene change, etc.) associated with the respective portion of the content. For example, the content element 211 may be and/or be associated with metadata that indicates and/or causes a scene transition between the portion 203 of content 200 and the portion 204 of the content 200. The scene transition may be associated with and/or identified by a visually black screen (as indicated by 225 and 226), a lack of dialog/audio, or the like occurring at the portion 203 of content 200 and the portion 204 of the content 200 and at the portion 206 of content 200 and the portion 207 of the content 200. As another example, the content elements 208, 209, 210, 211, 212, 213, 214 may be and/or be associated with metadata that associates the respective portions 201, 202, 203, 204, 205, 206, 207 of the content 200 with one or more advertisements. As another example, the content elements 208, 209, 210, 211, 212, 213, 214 may be and/or be associated with metadata that associates an audio level with the respective portions 201, 202, 203, 204, 205, 206, 207.

The content elements 208, 209, 210, 211, 212, 213, 214 may be used to determine (e.g., vary, adapt, etc.) a bitrate for and/or to associate with the respective portions 201, 202, 203, 204, 205, 206, 207 of the content 200. Each content portion 201, 202, 203, 204, 205, 206, 207 may be associated with a bitrate, indicated by 215, 216, 217, 218, 219, 220, 221. The bitrates 215, 216, 217, 218, 219, 220, 221 may be associated with the respective portions 201, 202, 203, 204, 205, 206, 207 of the content 200 based on attributes (e.g., a scene transition 225, a scene transition 226, etc.) of the content 200 associated with the respective portions 201, 202, 203, 204, 205, 206, 207 and indicated by a content elements 208, 209, 210, 211, 212, 213, 214. For example, the portions 217 and 220 may be associated with a low bitrate and/or a plurality of low bitrates (e.g., a range of low bitrates indicted by 222) because the content element 210 and 213, respectively, indicates a scene transition (e.g. scene change, etc.) associated with the portions 203 and 206 of the content 200. A quality of consumption associated with the portions 203 and 206 of the content 200 may not (will not) be perceived as impacted (e.g., visually/audibly detected by a user consuming the portions 203 and 206) by a low bitrate because a scene transition (e.g., 225 and 226) may be associated with a visually black screen, a lack of dialog/audio, or the like occurring at the portions 203 and 206. A medium bitrate (e.g., a range of medium bitrates indicted by 223) may be associated with the portions 201, 202, 207 because the respective content elements 208, 209, 214 indicate that a scene transition (e.g. scene change, etc.) associated with the portions 201, 202, 207 does not occur. Portions 204 and 205 of the content 200 may be associated with a high bitrate (e.g., a range of high bitrates indicted by 224) because the portions 204 and 205 are after the scene transition 225. A portion of content occurring after a scene transition may be an indication (e.g., indicated by an associated content element, etc.) that the portions 204 and 205 of the content 200 are associated with an important scene of the content 200, such as a scene/portion of the content 200 where a quality of consumption associated with the scene/portion will be perceived as impacted if the scene/portion of the content is consumed at a low bitrate or a medium bitrate. Any bitrate and/or plurality of bitrates may be associated with any portion of the content 200 based on a content element associated with the portion of the content 200.

A bitrate or a range of bitrates (e.g., the low bitrates 222, the medium bitrates 223, the high bitrates 224, etc.) may be associated with the portions 201, 202, 203, 204, 205, 206, 207 of the content 200 based on additional content related items (e.g., one or more advertisements, one or more references to related content, etc.) associated with the portions 201, 202, 203, 204, 205, 206, 207 of the content 200 indicated by the content elements 208, 209, 210, 211, 212, 213, 214. For example, a bitrate (e.g., a low bitrate, a medium bitrate, a high bitrate, etc.) and/or a plurality of bitrates (e.g., the low bitrates 222, the medium bitrates 223, the high bitrates 224, etc.) may be associated with portions 201, 202, 203, 204, 205, 206, 207 of the content 200 if the content elements 208, 209, 210, 211, 212, 213, 214 indicate that an advertisement (e.g., a portion(s) of an advertisement, an advertisement segment, an advertisement spot, etc.) is associated with the portions 201, 202, 203, 204, 205, 206, 207. The advertisement may be associated with the portions 201, 202, 203, 204, 205, 206, 207 based on metadata associated with the advertisement (e.g., a portion(s) of an advertisement, an advertisement segment, an advertisement spot, etc.) and/or the portions 201, 202, 203, 204, 205, 206, 207 of the content 200. Any bitrate and/or any plurality of bitrates may be associated with the portions 201, 202, 203, 204, 205, 206, 207 of the content 200 if a content element indicates that an advertisement (e.g., a portion(s) of an advertisement, an advertisement segment, an advertisement spot, etc.) is associated with the portions 201, 202, 203, 204, 205, 206, 207.

Figure 3:
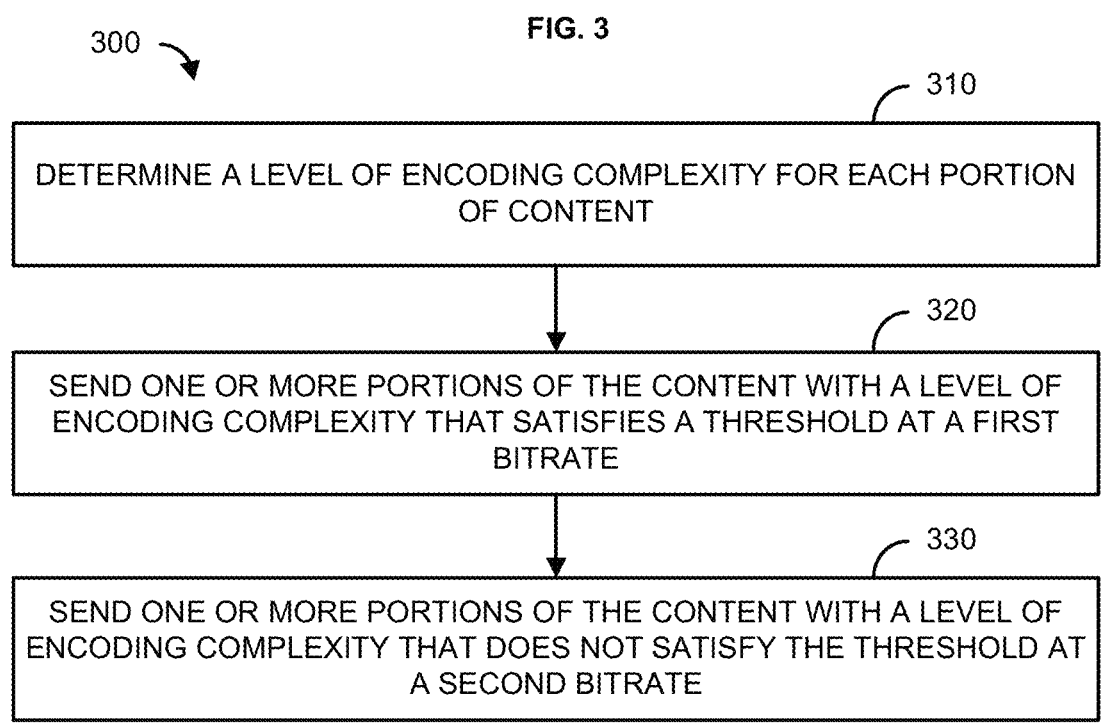
FIG. 3 shows a flowchart of a method for variable bitrate content.

FIG. 3 is a flowchart of an example method 300 for providing variable bitrate content. Content (e.g., video content, audio content, multimedia content, etc.) may comprise a plurality of portions (e.g., frames, segments, fragments, etc.). At 310 a level of encoding complexity may be determined for each portion of a plurality of portions of content. A device (e.g., the content management device 128, a computing device, a network device, a communication terminal, etc.) may determine the level of encoding complexity for each portion of a plurality of portions of content.

The plurality of portions of the content may be based on a determined amount of time (e.g., time window, time duration, etc.). For example, each portion of the plurality of portions of the content may be based on and/or associated with an interval (e.g., 2-second interval, etc.) of the content. The interval may comprise and/or be associated with a frame (e.g., a portion) of the content, a group of frames of the content, a block of the content, or the like.

An encoding parameter may be determined with each portion of the plurality of portions of the content. The encoding parameter can indicate a level of complexity (e.g., low complexity, medium complexity, high complexity, etc.) to encode (e.g., for the content management device 128 and/or any other device to encode) the respective portion of the content. The level of complexity can be based on one or more of a prediction frame error associated with the respective portion of the content, a relative size of an inter-coded frame of the respective portion of the content with respect to an intra-coded frame of the respective portion of the content, or a number of motion vectors to encode a frame of the respective portion of the content. The level of complexity can be based on a numerical count, an average, a categorization, or the like, of information about encoding a portion of the content. The level of complexity can be based on and/or determined by an amount of change between a plurality of pixels associated with a previous portion of the content and a corresponding plurality of pixels associated with the respective portion of the content. For example, a level of complexity to encode a portion of content can be low if an amount of change in pixels between the portions of content does not satisfy a threshold, or the level of complexity to encode the portion of content can be high if the amount of change in pixels between the portions of content satisfies or exceeds the threshold.

The device (e.g., the content management device 128, a computing device, a network device, a communication terminal, etc.) may send the content to the user device such that each portion of the content is associated with a level of encoding complexity and/or at a bitrate and/or a plurality of bitrates determined based on level of encoding complexity. The content may be provided to the network device and/or any other device as streaming content, downloaded content, referenced and retrieved content, or the like. The device may provide the content in a form comprising, an index file, a multimedia file, a text file, code, a script, metadata, resource location(s), combinations thereof, or the like. For example, the device may provide the content to the user device and/or any other device as a manifest file comprising a plurality of references to the content. The device may provide the content to the user device and/or any other device as a manifest file comprising a plurality of references to the content such that each portion of the content is associated with a bitrate and/or a plurality of bitrates determined based on a level of encoding complexity. The device may provide the content to the user device and/or any other device by any method. The user device and/or any other device may retrieve/receive the content by any method.

At 320 one or more portions of the plurality of portions of the content that have a level of encoding complexity that satisfies a threshold may be sent at a bitrate. The device (e.g., the content management device 128, a computing device, a network device, a communication terminal, etc.) may send, at a first bitrate, one or more portions of the plurality of portions of the content that have a level of encoding complexity that satisfies a threshold to a user device (e.g., a content player, the media device 120, a smart device, the mobile device 124, a computing device, etc.).

The level of encoding complexity for a portion of the content may satisfy a threshold when the portion of the content is associated with a complex scene, contains many detailed images, is associated with enhanced audio, and/or any other attribute of the portion of the content. The first bitrate may be a high bitrate. A high/higher bitrate may improve a quality of display of the portion of the content. The user device may consume the content and/or portions of the content in a best possible quality based on the high bitrate. The best possible quality may be a quality (e.g., picture quality, sound quality, visual quality, etc.) of the content with image artifacts, blurred images, illegible sound, paused/frozen content, or the like reduced and/or negligible. To ensure that the each portion of the plurality of portions of the content is consumed at the best quality, the user device may determine/select the first bitrate of a plurality of bitrates based on the level of encoding complexity associated with the portion of the content.

At 330 one or more portions of the plurality of portions of the content that have a level of encoding complexity that does not satisfy a threshold may be sent at a bitrate. The device (e.g., the content management device 128, a computing device, a network device, a communication terminal, etc.) may send, at a second bitrate, one or more portions of the plurality of portions of the content that have a level of encoding complexity that does not satisfy the threshold to the user device (e.g., a content player, the media device 120, a smart device, the mobile device 124, a computing device, etc.).

The level of encoding complexity for a portion of the content may not satisfy the threshold when the portion of the content is associated with a non-complex scene, contains basic and/or monochromatic images, is associated with a scene transition, and/or any other attribute of the portion of the content. The second bitrate may be a low bitrate. A level of encoding complexity for a portion of the content that does not satisfy the threshold may indicate that the portion of the content may be sent to the user device at a low bitrate because a quality of consumption (e.g., picture quality, sound quality, visual quality, etc.) of the portion of content will not be impacted (e.g., will not be substantially impacted, will be minimally impacted, etc.) by the low bitrate. The level of encoding complexity for a portion of the content may not satisfy the threshold when the portion of the content is associated with a non-complex scene, contains basic and/or monochromatic images, contains a lack of dialog/audio, and/or any other attribute of the portion of the content. A quality of consumption associated with the portion of the content may not (will not) be perceived as impacted (e.g., visually/audibly detected by a user consuming the portion of the content) by a low bitrate.

Figure 4:
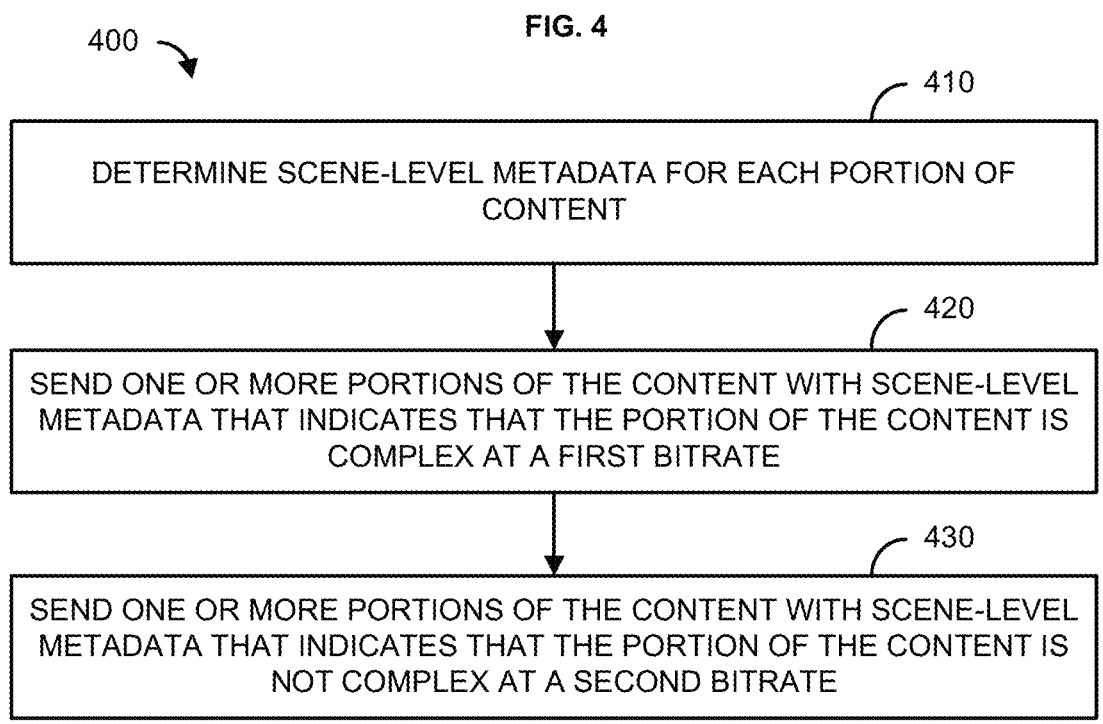
FIG. 4 shows a flowchart of a method for variable bitrate content.

FIG. 4 is a flowchart of an example method 400 for providing variable bitrate content. Content (e.g., video content, audio content, multimedia content, etc.) may comprise a plurality of portions (e.g., frames, segments, fragments, etc.). At 410 scene-level metadata may be determined for each portion of a plurality of portions of content. A device (e.g., the content management device 128, a computing device, a network device, a communication terminal, etc.) may determine the scene-level metadata for each portion of a plurality of portions of content.

The plurality of portions of the content may be based on a determined amount of time (e.g., time window, time duration, etc.). For example, each portion of the plurality of portions of the content may be based on and/or associated with an interval (e.g., 2-second interval, etc.) of the content. The interval may comprise and/or be associated with a frame (e.g., a portion) of the content, a group of frames of the content, a block of the content, or the like.

Scene-level metadata may be determined with each portion of the plurality of portions of the content. The scene-level metadata may indicate whether a scene associated with a portion of the plurality of portions of the content is complex or non-complex. Whether a scene is complex or non-complex may be based on one or more advertisements associated with the portion of the content, audio attributes of the content, and/or any other attribute associated with the content and/or the portion of the content.

The device (e.g., the content management device 128, a computing device, a network device, a communication terminal, etc.) may send the content to the user device such that each portion of the content is associated with scene-level metadata and/or at a bitrate and/or a plurality of bitrates determined based on scene-level metadata. The content may be provided to the network device and/or any other device as streaming content, downloaded content, referenced and retrieved content, or the like. The device may provide the content in a form comprising, an index file, a multimedia file, a text file, code, a script, metadata, resource location(s), combinations thereof, or the like. For example, the device may provide the content to the user device and/or any other device as a manifest file comprising a plurality of references to the content. The device may provide the content to the user device and/or any other device as a manifest file comprising a plurality of references to the content such that each portion of the content is associated with a bitrate and/or a plurality of bitrates determined based on scene-level metadata associated with each portion of the content. The device may provide the content to the user device and/or any other device by any method. The user device and/or any other device may retrieve/receive the content by any method.

At 420 one or more portions of the plurality of portions of the content that have scene-level metadata indicative of content that is complex may be sent at a bitrate. The device (e.g., the content management device 128, a computing device, a network device, a communication terminal, etc.) may send, at a first bitrate, one or more portions of the plurality of portions of the content that scene-level metadata indicative of content that is complex to a user device (e.g., a content player, the media device 120, a smart device, the mobile device 124, a computing device, etc.). Scene-level metadata indicative of content that is complex may be based on one or more of pixel illumination, an audio level, or closed captioning information associated with a portion of the content. The first bitrate may be a high bitrate. A high/higher bitrate may improve a quality of display of the portion of the content. The user device may consume the content and/or portions of the content in a best possible quality based on the high bitrate. The best possible quality may be a quality (e.g., picture quality, sound quality, visual quality, etc.) of the content with image artifacts, blurred images, illegible sound, paused/frozen content, or the like reduced and/or negligible. To ensure that the each portion of the plurality of portions of the content is consumed at the best quality, the user device may determine/select the first bitrate of a plurality of bitrates based on the scene-level metadata associated with the portion of the content.

At 430 one or more portions of the plurality of portions of the content that have scene-level metadata indicative of content that is not complex may be sent at a bitrate. The device (e.g., the content management device 128, a computing device, a network device, a communication terminal, etc.) may send, at a second bitrate, one or more portions of the plurality of portions of the content that have scene-level metadata indicative of content that is not complex to the user device (e.g., a content player, the media device 120, a smart device, the mobile device 124, a computing device, etc.).

The scene-level metadata may indicate that content that is not complex when the portion of the content is associated with a non-complex scene, contains basic and/or monochromatic images, is associated with a scene transition, and/or is associated with an advertisement. The scene-level metadata may indicate that content that is not complex based on pixel illumination (e.g., chromatic scenes, monochromatic scenes, etc.), an audio level, or closed captioning information associated with the portion of the content, and/or any other attribute of the portion of the content. The second bitrate may be a low bitrate. Scene-level metadata that is not complex may indicate that the portion of the content may be sent to the user device at a low bitrate because a quality of consumption (e.g., picture quality, sound quality, visual quality, etc.) of the portion of content will not be impacted (e.g., will not be substantially impacted, will be minimally impacted, etc.) by the low bitrate. A quality of consumption associated with the portion of the content may not (will not) be perceived as impacted (e.g., visually/audibly detected by a user consuming the portion of the content) by a low bitrate.

Figure 5:
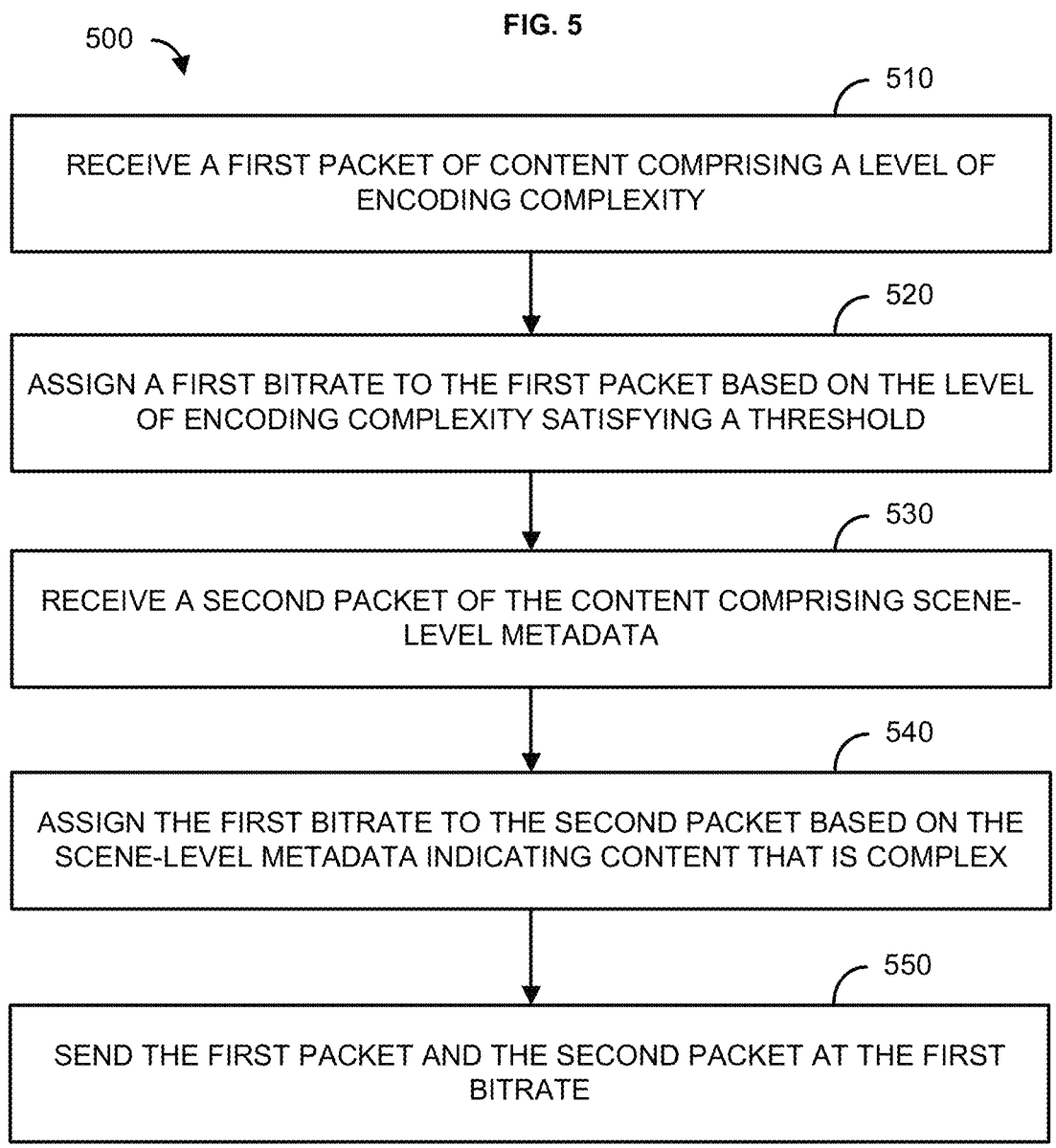
FIG. 5 shows a flowchart of a method for variable bitrate content.

FIG. 5 is a flowchart of an example method 500 for providing variable bitrate content. Content (e.g., video content, audio content, multimedia content, etc.) may comprise a plurality of portions (e.g., frames, segments, fragments, etc.). The plurality of portions of the content may be based on a determined amount of time (e.g., time window, time duration, etc.). For example, each portion of the plurality of portions of the content may be based on and/or associated with an interval (e.g., 2-second interval, etc.) of the content. The interval may comprise and/or be associated with a frame (e.g., a portion) of the content, a group of frames of the content, a block of the content, or the like. Each portion of the plurality of portions of the content may be and/or be associated with a packet of the content. At 510 a first packet of content may be received. A device (e.g., the content management device 128, a computing device, a network device, a communication terminal, etc.) may receive the first packet and the first packet may comprise a level of encoding complexity associated with the portion of the content. The device may receive the first packet from a content source (e.g., content source 127) and/or any other source/device. The device may receive the first packet from a content source (e.g., content source 127) and/or any other source/device based on a request for the content, such as a request from a user device (e.g., a content player, the media device 120, a smart device, the mobile device 124, a computing device, etc.) for the content. Each packet of the content may comprise an encoding parameter. The encoding parameter can indicate the level of complexity (e.g., low complexity, medium complexity, high complexity, etc.) to encode (e.g., for the content management device 128 and/or any other device to encode) the respective portion/packet of the content. The level of complexity can be based on one or more of a prediction frame error associated with the first packet of the content, a relative size of an inter-coded frame of the first packet of the content with respect to an intra-coded frame of the first packet of the content, or a number of motion vectors to encode the first packet of the content. The level of complexity can be based on a numerical count, an average, a categorization, or the like, of information about encoding the first packet of the content. The level of complexity can be based on and/or determined by an amount of change between a plurality of pixels associated with a previous packet of the content and a corresponding plurality of pixels associated with the first packet of the content. A level of complexity to encode the first packet of the content can be low if an amount of change in pixels between the first packet of the content and other packets of the content does not satisfy a threshold, or the level of complexity to encode the portion of content can be high if the amount of change in pixels between the first packet of the content and other packets of the content satisfies or exceeds the threshold.

At 520, a bitrate may be assigned to and/or determined for the first packet of the content. The device (e.g., the content management device 128, a computing device, a network device, a communication terminal, etc.) may assign (determine) a first bitrate for the first packet of the content based on the level of encoding complexity of the first packet satisfying a threshold. The level of encoding complexity of the first packet of the content may satisfy the threshold when the of the first packet the content is associated with a complex scene, contains many detailed images, is associated with enhanced audio, and/or any other attribute of the portion of the content. The first bitrate may be a high bitrate. A high/higher bitrate may improve a quality of display of the first packet of the content. The user device may consume the content and/or first packet of the content in a best possible quality based on the first bitrate. The best possible quality may be a quality (e.g., picture quality, sound quality, visual quality, etc.) of the content with image artifacts, blurred images, illegible sound, paused/frozen content, or the like reduced and/or negligible.

When the first packet (or any other packet) of the content is associated with a level of encoding complexity that does not satisfy the threshold, the first packet (or any other packet) may be assigned a second bitrate. The level of encoding complexity for the first packet (or any other packet) of the content may not satisfy the threshold when the first packet (or any other packet) of the content is associated with a non-complex scene, contains basic and/or monochromatic images, is associated with a scene transition, and/or any other attribute of the portion of the content. The second bitrate may be a low bitrate. A level of encoding complexity for the first packet (or any other packet) of the content that does not satisfy the threshold may indicate that the first packet (or any other packet) of the content may be sent to the user device at a low bitrate because a quality of consumption (e.g., picture quality, sound quality, visual quality, etc.) of the portion of content will not be impacted (e.g., will not be substantially impacted, will be minimally impacted, etc.) by the low bitrate. The level of encoding complexity for the first packet (or any other packet) of the content may not satisfy the threshold when the first packet (or any other packet) of the content is associated with a non-complex scene, contains basic and/or monochromatic images, contains a lack of dialog/audio, and/or any other attribute of the portion of the content. A quality of consumption associated with the first packet (or any other packet) of the content may not (will not) be perceived as impacted (e.g., visually/audibly detected by a user consuming the portion of the content) by a low bitrate.

At 530 a second packet of content may be received. The device (e.g., the content management device 128, a computing device, a network device, a communication terminal, etc.) may receive the second packet and the second packet may comprise scene-level metadata associated with the portion of the content. The device may receive the second packet from the content source (e.g., content source 127) and/or any other source/device. Each packet of the content may comprise scene-level metadata. The scene-level metadata may indicate whether a scene associated with a portion of the plurality of portions of the content is complex or non-complex. Whether a scene is complex or non-complex may be based on one or more advertisements associated with the portion of the content, audio attributes of the content, and/or any other attribute associated with the content and/or the portion of the content.

At 540, a bitrate may be assigned to and/or determined for the second packet of the content. The device (e.g., the content management device 128, a computing device, a network device, a communication terminal, etc.) may assign (determine) the first bitrate for the second packet of the content based on the scene-level metadata indicating that the packet (portion) of the content that is complex. Scene-level metadata indicative of content that is complex may be based on one or more of pixel illumination, an audio level, or closed captioning information associated with a portion of the content. As described, the first bitrate may be a high bitrate. A high/higher bitrate may improve a quality of display of the portion of the content. The user device may consume the content and/or portions of the content in a best possible quality based on the high bitrate. The best possible quality may be a quality (e.g., picture quality, sound quality, visual quality, etc.) of the content with image artifacts, blurred images, illegible sound, paused/frozen content, or the like reduced and/or negligible. To ensure that the packet of the content is consumed at the best quality, the user device may determine/select the first bitrate of a plurality of bitrates based on the scene-level metadata associated with the portion of the content.

When the second packet (or any other packet) of the content is associated with scene-level metadata that is not complex, the second packet (or any other packet) may be assigned the second bitrate. The scene-level metadata may indicate that content that is not complex when the portion of the content is associated with a non-complex scene, contains basic and/or monochromatic images, is associated with a scene transition, and/or is associated with an advertisement. The scene-level metadata may indicate that content that is not complex based on pixel illumination (e.g., chromatic scenes, monochromatic scenes, etc.), an audio level, or closed captioning information associated with the portion of the content, and/or any other attribute of the portion of the content. As described, the second bitrate may be a low bitrate. Scene-level metadata that is not complex may indicate that the portion of the content may be sent to the user device at a low bitrate because a quality of consumption (e.g., picture quality, sound quality, visual quality, etc.) of the portion of content will not be impacted (e.g., will not be substantially impacted, will be minimally impacted, etc.) by the low bitrate. A quality of consumption associated with the portion of the content may not (will not) be perceived as impacted (e.g., visually/audibly detected by a user consuming the portion of the content) by a low bitrate.

At 540, the first packet and the second packet may be sent at the first bitrate. The device (e.g., the content management device 128, a computing device, a network device, a communication terminal, etc.) may send the first packet and the second packet of the content to the user device at the first bitrate. The first packet and the second packet of the content may be provided to the user device and/or any other device as streaming content, downloaded content, referenced and retrieved content, or the like. The device may provide the first packet and the second packet of the content in a form comprising, an index file, a multimedia file, a text file, code, a script, metadata, resource location(s), combinations thereof, or the like. For example, the device may send/provide the first packet and the second packet of the content to the user device and/or any other device as a manifest file comprising a plurality of references to the first packet, the second packet, and/or any other packet of the content. The device may send/provide the first packet, the second packet, and/or any other packet of the content to the user device and/or any other device as a manifest file comprising a plurality of references to the first packet, the second packet, and/or any other packet of the content such that each portion of the content is associated with the first bitrate, the second bitrate, and/or any other bitrate. The device may provide the first packet, the second packet, and/or any other packet of the content to the user device and/or any other device by any method. The user device and/or any other device may retrieve/receive the first packet, the second packet, and/or any other packet of the content by any method.

Figure 6:
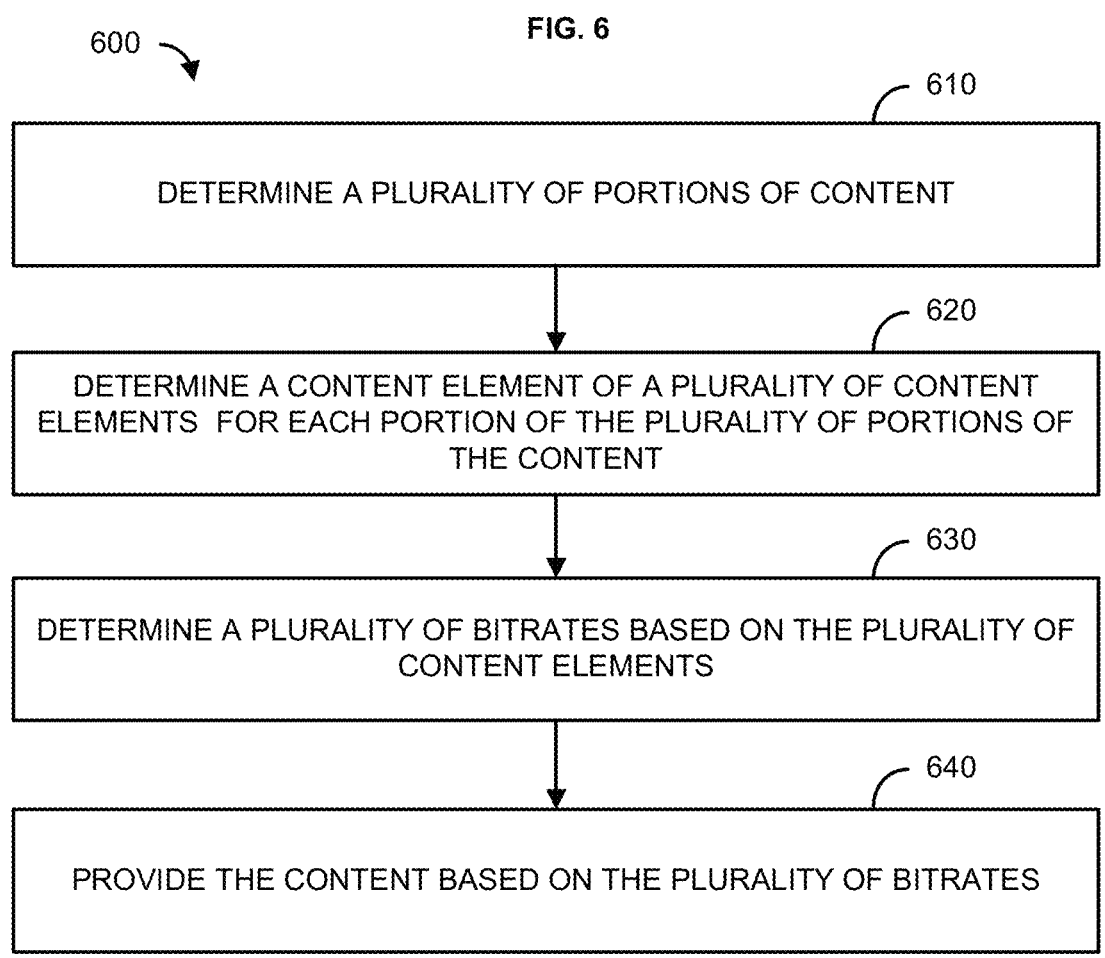
FIG. 6 shows a flowchart of a method for variable bitrate content.

FIG. 6 is a flowchart of an example method 600 for providing variable bitrate content. Content (e.g., video content, audio content, multimedia content, etc.) may comprise a plurality of portions (e.g., frames, segments, fragments, etc.). At 610 a plurality of portions of content from one or more content sources (e.g., the content source(s) 127, etc.) may be determined. A device (e.g., the content management device 128, a computing device, a network device, a communication terminal, etc.) may determine the plurality of portions of the content. The plurality of portions of the content may be based on a determined amount of time (e.g., time window, time duration, etc.). For example, each portion of the plurality of portions of the content may be based on and/or associated with an interval (e.g., 2-second interval, etc.) of the content. The interval may comprise and/or be associated with a frame (e.g., a portion) of the content, a group of frames of the content, a block of the content, or the like.

At 620, a plurality of content elements associated with the content may be determined. The device (e.g., the content management device 128, the computing device, the network device, the communication terminal, etc.) may determine the plurality of content elements. Each portion of the plurality of portions of the content may be associated (e.g., tagged, etc.) with a respective content element of a plurality of content elements.

A content element may be associated with an encoding parameter associated with the respective portion of the content. The encoding parameter may indicate a level of complexity (e.g., low complexity, medium complexity, high complexity, etc.) to encode (e.g., for the content management device 128 and/or any other device to encode) the respective portion of the content. The level of complexity may be based on one or more of a prediction frame error associated with the respective portion of the content, a relative size of an inter-coded frame of the respective portion of the content with respect to an intra-coded frame of the respective portion of the content, or a number of motion vectors to encode a frame of the respective portion of the content. The level of complexity may be based on a numerical count, an average, a categorization, or the like, of information about encoding a portion of the content. The level of complexity may be based on and/or determined by an amount of change between a plurality of pixels associated with a previous portion of the content and a corresponding plurality of pixels associated with the respective portion of the content. For example, a level of complexity to encode a portion of content may be low if an amount of change in pixels between the portions of content does not satisfy a threshold, or the level of complexity to encode the portion of content may be high if the amount of change in pixels between the portions of content satisfies or exceeds the threshold.

A content element may be associated with attributes of content (e.g., a scene transition, scene change, etc.) associated with the respective portion of the content. For example, the content element may be and/or be associated with metadata that indicates and/or causes a scene transition between a previous portion (or a post portion) of content and the respective portion of the content. As another example, the content element may be and/or be associated with metadata that associates the respective portion of the content with one or more advertisements. As another example, the content element may be and/or be associated with metadata that associates an audio level with the respective portion of the content. A content element of a plurality of content elements may be determined and associated with each portion of a plurality of portions of the content based on any aspect of the content or a respective portion of the content.

At 630, a bitrate and/or a plurality of bitrates may be determined and associated with each portion of the plurality of portions of the content. The device (e.g., the content management device 128, the computing device, the network device, the communication terminal, etc.) may determine, for each portion of the plurality of portions of the content, based on the respective content element, a respective bitrate of a plurality of bitrates. The plurality of content elements may be used to determine a plurality of bitrates to associate with the plurality of portions of content such that each portion of the plurality of portions of the content is associated with a content element and one or more bitrates, such as a low bitrate, a medium bitrate, a high bitrate, or the like. Any range of bitrates may be determined to be a low bitrate, a medium bitrate, or a high bitrate. The device (e.g., the content management device 128, the computing device, the network device, the communication terminal, etc.) may determine that any bitrate is a low bitrate, a medium bitrate, or a high bitrate. Any range of bitrates may be determined to be a low bitrate, a medium bitrate, or a high bitrate by and/or based on any method, such as based on network (e.g., the network 116, etc.) conditions (e.g., latency in a portion/channel of the network, network congestion, provisioned information and/or data transfer rates, etc.), user determined bitrate classifications (e.g., user defined bitrate ranges from high to low, etc.), dynamically determined bitrate classifications, or the like. Any bitrate and/or plurality of bitrates may be associated with any portion of the content based on a respective content element associated with the portion of the content.

A bitrate and/or a plurality of bitrates may be associated with a portion of the plurality of portions of the content based on an associated level of complexity to encode the portion of the content (as indicated by a respective content element). The device (e.g., the content management device 128, the computing device, the network device, the communication terminal, etc.) may determine the bitrate and/or the plurality of bitrates an associate the bitrate and/or the plurality of bitrates with the portion of the plurality of portions of the content based on the associated level of complexity to encode the portion of the content (as indicated by the respective content element). For example, an impact on a quality of consumption (e.g., picture quality, sound quality, visual quality, etc.) of a portion of content may be caused by network congestion (or any other cause) and may result in image artifacts, blurred images, illegible sound, paused/frozen content, and the like associated with the portion of content.

A low level of complexity to encode a portion of content may indicate that the portion of the content may be provided to a network device (e.g., a content player, the media device 120, a smart device, the mobile device 124, a computing device, etc.) at a low bitrate because a quality of consumption (e.g., picture quality, sound quality, visual quality, etc.) of the portion of content by the network device (a user of the network device) will not be impacted (e.g., will not be substantially impacted, will be minimally impacted, etc.) by the low bitrate. The device (e.g., the content management device 128, the computing device, the network device, the communication terminal, etc.) may determine that an encoding parameter associated/indicated by a content element indicates that a portion of content is associated with a level of complexity (e.g., a low level of complexity, a medium level of complexity, a high level of complexity, etc.) to encode (e.g., encoded by the encoding module 130 and/or any other device) the portion of the content. A low bitrate and/or a plurality of low bitrates may be associated with a portion of the content associated with a content element (e.g., an encoding parameter) that indicates a low level of complexity to encode the portion of the content. A high level of complexity to encode a portion of content may indicate that the portion of the content should be provided to the network device and/or any other device at a high bitrate because a quality of consumption (e.g., picture quality, sound quality, visual quality, etc.) of the portion of content by the network device (a user of the network device) and/or any other device will be impacted if the portion of the content is not provided and/or consumed at a high bitrate. The device (e.g., the content management device 128, the computing device, the network device, the communication terminal, etc.) may associate a high bitrate and/or a plurality of high bitrates to a portion of the content associated with a content element (e.g., encoding parameter) that indicates a high level of complexity to encode the portion of the content. Any bitrate and/or plurality of bitrates may be associated with any portion of content based on a content element associated with the portion of the content.

A bitrate and/or a plurality of bitrates may be associated with each portion of the plurality of portions of the content based on attributes (e.g., a scene transition, a scene change, etc.) of the content associated with the respective portion of the content and indicated by a content element. For example, the device (e.g., the content management device 128, the computing device, the network device, the communication terminal, etc.) may associate a low bitrate and/or a plurality of low bitrates to a portion of the content associated with a content element that indicates a scene transition (e.g. scene change, etc.) associated with the portion(s) of the content. A quality of consumption associated with the portion of the content may not (will not) be perceived as impacted (e.g., visually/audibly detected by a user consuming the portion of the content) by a low bitrate because a scene transition may be associated with a visually black screen, a lack of dialog/audio, or the like occurring at the point (e.g., portion of the content) of the scene transition. The device (e.g., the content management device 128, the computing device, the network device, the communication terminal, etc.) may associate a medium/high bitrate and/or a plurality of medium/high bitrates with portions of the content associated with a content element that indicates a scene transition (e.g. scene change, etc.) associated with the portion(s) of the content does not occur. A scene transition that does not occur during a portion of the content may be an indication (e.g., indicated by an associated content element, etc.) that the portion of the content is associated with an important scene of the content, such as a scene/portion of the content where a quality of consumption associated with the scene/portion will be perceived as impacted if the scene/portion of the content is consumed at a low bitrate. Any bitrate and/or plurality of bitrates may be associated with any portion of content based on a content element associated with the portion of the content.

The device (e.g., the content management device 128, the computing device, the network device, the communication terminal, etc.) may associate a bitrate and/or a plurality of bitrates to each portion of a plurality of portions of content based on additional content related items (e.g., one or more advertisements, one or more references to related content, etc.) associated with a respective portion of the content and indicated by a content element. For example, a bitrate (e.g., a low bitrate, a medium bitrate, a high bitrate, etc.) and/or a plurality of bitrates may be associated with a portion of content associated with a content element that indicates that an advertisement (e.g., a portion(s) of an advertisement, an advertisement segment, an advertisement spot, etc.) is associated with the portion of the content. The advertisement may be associated with the portion of the content based on metadata associated with the advertisement (e.g., a portion(s) of an advertisement, an advertisement segment, an advertisement spot, etc.) and/or the portion of the content. Any bitrate and/or any plurality of bitrates may be associated with portions of content associated with a content element that indicates that an advertisement (e.g., a portion(s) of an advertisement, an advertisement segment, an advertisement spot, etc.) is associated with the portion of the content.

The device (e.g., the content management device 128, the computing device, the network device, the communication terminal, etc.) may store the content and/or provide the content to storage (e.g., a database, a cloud-based storage, etc.). The device or any other device may store the content and/or provide the content to storage such that each portion of the content is stored with an association to a bitrate and/or a plurality of bitrates determined based on the content element associated with the respective portion of the content.

At 640 the content may be provided to a network device. The device (e.g., the content management device 128, the computing device, the network device, the communication terminal, etc.) may provide the content to the network device. The device may provide the content to the network device based on a request for the content. The device may provide the content to the network device such that each portion of the content is provided at a bitrate and/or a plurality of bitrates determined based on the content element associated with the respective portion of the content. The content may be provided to the network device and/or any other device as streaming content, downloaded content, referenced and retrieved content, or the like. The content may be provided in a form comprising an index file, a multimedia file, a text file, code, a script, metadata, resource location(s), combinations thereof, or the like. For example, the network device and/or any other device may receive/retrieve the content as a manifest file comprising a plurality of references to the content. The network device and/or any other device may receive/retrieve the content as a manifest file comprising a plurality of references to the content such that each portion of the plurality of portions of the content is associated with a bitrate and/or a plurality of bitrates determined based on a respective content element associated with a respective portion of the content. The content may be provided, retrieved, and/or received by the network device and/or any other device by any method.

The network device (e.g., a content player, the media device 120, a smart device, the mobile device 124, a computing device, etc.) and/or any other device may consume the content and/or portions of the content in a best possible quality (e.g., based on a best possible bitrate, etc.) according to a plurality of content elements associated with the content (e.g., a plurality of portions of the content). The best possible quality may be a quality (e.g., picture quality, sound quality, visual quality, etc.) of the content with image artifacts, blurred images, illegible sound, paused/frozen content, or the like reduced and/or negligible.

Figure 7:
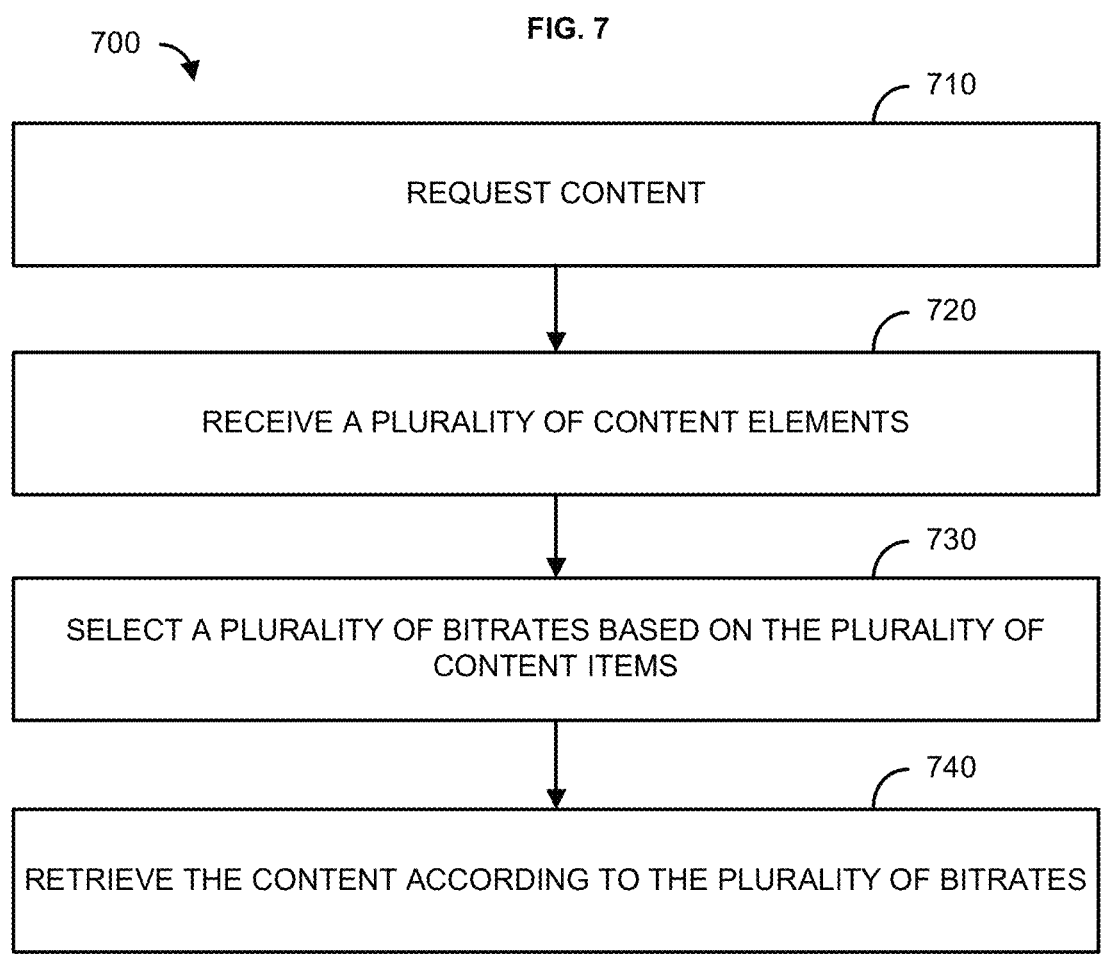
FIG. 7 shows a flowchart of a method for variable bitrate content.

FIG. 7 is a flowchart of an example method 700 for providing variable bitrate content. At 710 content (e.g., video content, audio content, multimedia content, etc.) may be requested. The content may be requested by a network device (e.g., a content player, the media device 120, a smart device, the mobile device 124, a computing device, etc.) from one or more content sources (e.g., the content source(s) 127, etc.). The content may comprise a plurality of portions (e.g., frames, segments, fragments, etc.). Each portion of the plurality of portions of the content may be based on and/or associated with an interval (e.g., 2-second interval, etc.) of the content. The interval may comprise and/or be associated with a frame (e.g., a portion) of the content, a group of frames of the content, a block of the content, or the like.

At 720, a plurality of content elements and a plurality of references to the content may be received. The network device (e.g., a content player, the media device 120, a smart device, the mobile device 124, a computing device, etc.) may receive the plurality of content elements and the plurality of references to the content. For example, network device may receive/retrieve a manifest file, an index file, a multimedia file, a text file, code, a script, metadata, resource location(s), combinations thereof, or the like comprising the plurality of content elements and the plurality of references to the content.

Each content element of the plurality of content elements may be associated with a portion of the plurality of portions of the content. A device (e.g., the content management device 128, a computing device, a network device, a communication terminal, etc.) may determine the plurality of content elements. Each portion of the plurality of portions of the content may be associated (e.g., tagged, etc.) with a respective content element of a plurality of content elements.

A content element may be associated with an encoding parameter associated with the respective portion of the content. The encoding parameter may indicate a level of complexity (e.g., low complexity, medium complexity, high complexity, etc.) to encode (e.g., for the content management device 128 and/or any other device to encode) the respective portion of the content. The level of complexity may be based on one or more of a prediction frame error associated with the respective portion of the content, a relative size of an inter-coded frame of the respective portion of the content with respect to an intra-coded frame of the respective portion of the content, or a number of motion vectors to encode a frame of the respective portion of the content. The level of complexity may be based on a numerical count, an average, a categorization, or the like, of information about encoding a portion of the content. The level of complexity may be based on and/or determined by an amount of change between a plurality of pixels associated with a previous portion of the content and a corresponding plurality of pixels associated with the respective portion of the content. For example, a level of complexity to encode a portion of content may be low if an amount of change in pixels between the portions of content does not satisfy a threshold, or the level of complexity to encode the portion of content may be high if the amount of change in pixels between the portions of content satisfies or exceeds the threshold.

A content element may be associated with attributes of content (e.g., a scene transition, scene change, etc.) associated with the respective portion of the content. For example, the content element may be and/or be associated with metadata that indicates and/or causes a scene transition between a previous portion (or a post portion) of content and the respective portion of the content. As another example, the content element may be and/or be associated with metadata that associates the respective portion of the content with one or more advertisements. As another example, the content element may be and/or be associated with metadata that associates an audio level with the respective portion of the content. A content element of a plurality of content elements may be determined and associated with each portion of a plurality of portions of the content based on any aspect of the content or a respective portion of the content.

Each reference of the plurality of references may be associated with a portion of the plurality of portions of the content and one or more bitrates of a plurality of bitrates. The device (e.g., the content management device 128, the computing device, the network device, the communication terminal, etc.) may determine, for each portion of the plurality of portions of the content, based on the respective content element, a respective bitrate of a plurality of bitrates. The plurality of content elements may be used to determine a plurality of bitrates to associate with the plurality of portions of content such that each portion of the plurality of portions of the content is associated with a content element and one or more bitrates, such as a low bitrate, a medium bitrate, a high bitrate, or the like. Any range of bitrates may be determined to be a low bitrate, a medium bitrate, or a high bitrate. The device (e.g., the content management device 128, the computing device, the network device, the communication terminal, etc.) may determine that any bitrate is a low bitrate, a medium bitrate, or a high bitrate. Any range of bitrates may be determined to be a low bitrate, a medium bitrate, or a high bitrate by and/or based on any method, such as based on network (e.g., the network 116, etc.) conditions (e.g., latency in a portion/channel of the network, network congestion, provisioned information and/or data transfer rates, etc.), user determined bitrate classifications (e.g., user defined bitrate ranges from high to low, etc.), dynamically determined bitrate classifications, or the like. Any bitrate and/or plurality of bitrates may be associated with any portion of the content based on a respective content element associated with the portion of the content.

A bitrate and/or a plurality of bitrates may be associated with a portion of the plurality of portions of the content based on an associated level of complexity to encode the portion of the content (as indicated by a respective content element). The device (e.g., the content management device 128, the computing device, the network device, the communication terminal, etc.) may determine the bitrate and/or the plurality of bitrates an associate the bitrate and/or the plurality of bitrates with the portion of the plurality of portions of the content based on the associated level of complexity to encode the portion of the content (as indicated by the respective content element). For example, an impact on a quality of consumption (e.g., picture quality, sound quality, visual quality, etc.) of a portion of content may be caused by network congestion (or any other cause) and may result in image artifacts, blurred images, illegible sound, paused/frozen content, and the like associated with the portion of content.

A low level of complexity to encode a portion of content may indicate that the portion of the content may be provided to the network device (e.g., a content player, the media device 120, a smart device, the mobile device 124, a computing device, etc.) at a low bitrate because a quality of consumption (e.g., picture quality, sound quality, visual quality, etc.) of the portion of content by the network device (a user of the network device) will not be impacted (e.g., will not be substantially impacted, will be minimally impacted, etc.) by the low bitrate. The device (e.g., the content management device 128, the computing device, the network device, the communication terminal, etc.) may determine that an encoding parameter associated/indicated by a content element indicates that a portion of content is associated with a level of complexity (e.g., a low level of complexity, a medium level of complexity, a high level of complexity, etc.) to encode (e.g., encoded by the encoding module 130 and/or any other device) the portion of the content. A low bitrate and/or a plurality of low bitrates may be associated with a portion of the content associated with a content element (e.g., an encoding parameter) that indicates a low level of complexity to encode the portion of the content. A high level of complexity to encode a portion of content may indicate that the portion of the content should be provided to the network device and/or any other device at a high bitrate because a quality of consumption (e.g., picture quality, sound quality, visual quality, etc.) of the portion of content by the network device (a user of the network device) and/or any other device will be impacted if the portion of the content is not provided and/or consumed at a high bitrate. The device (e.g., the content management device 128, the computing device, the network device, the communication terminal, etc.) may associate a high bitrate and/or a plurality of high bitrates to a portion of the content associated with a content element (e.g., encoding parameter) that indicates a high level of complexity to encode the portion of the content. Any bitrate and/or plurality of bitrates may be associated with any portion of content based on a content element associated with the portion of the content.

A bitrate and/or a plurality of bitrates may be associated with each portion of the plurality of portions of the content based on attributes (e.g., a scene transition, a scene change, etc.) of the content associated with the respective portion of the content and indicated by a content element. For example, the device (e.g., the content management device 128, the computing device, the network device, the communication terminal, etc.) may associate a low bitrate and/or a plurality of low bitrates to a portion of the content associated with a content element that indicates a scene transition (e.g. scene change, etc.) associated with the portion(s) of the content. A quality of consumption associated with the portion of the content may not (will not) be perceived as impacted (e.g., visually/audibly detected by a user consuming the portion of the content) by a low bitrate because a scene transition may be associated with a visually black screen, a lack of dialog/audio, or the like occurring at the point (e.g., portion of the content) of the scene transition. The device (e.g., the content management device 128, the computing device, the network device, the communication terminal, etc.) may associate a medium/high bitrate and/or a plurality of medium/high bitrates with portions of the content associated with a content element that indicates a scene transition (e.g. scene change, etc.) associated with the portion(s) of the content does not occur. A scene transition that does not occur during a portion of the content may be an indication (e.g., indicated by an associated content element, etc.) that the portion of the content is associated with an important scene of the content, such as a scene/portion of the content where a quality of consumption associated with the scene/portion will be perceived as impacted if the scene/portion of the content is consumed at a low bitrate. Any bitrate and/or plurality of bitrates may be associated with any portion of content based on a content element associated with the portion of the content.

The device (e.g., the content management device 128, the computing device, the network device, the communication terminal, etc.) may associate a bitrate and/or a plurality of bitrates to each portion of a plurality of portions of content based on additional content related items (e.g., one or more advertisements, one or more references to related content, etc.) associated with a respective portion of the content and indicated by a content element. For example, a bitrate (e.g., a low bitrate, a medium bitrate, a high bitrate, etc.) and/or a plurality of bitrates may be associated with a portion of content associated with a content element that indicates that an advertisement (e.g., a portion(s) of an advertisement, an advertisement segment, an advertisement spot, etc.) is associated with the portion of the content. The advertisement may be associated with the portion of the content based on metadata associated with the advertisement (e.g., a portion(s) of an advertisement, an advertisement segment, an advertisement spot, etc.) and/or the portion of the content. Any bitrate and/or any plurality of bitrates may be associated with portions of content associated with a content element that indicates that an advertisement (e.g., a portion(s) of an advertisement, an advertisement segment, an advertisement spot, etc.) is associated with the portion of the content.

The device (e.g., the content management device 128, the computing device, the network device, the communication terminal, etc.) may store the content and/or provide the content to storage (e.g., a database, a cloud-based storage, etc.). The device or any other device may store the content and/or provide the content to storage such that each portion of the content is stored with an association to a bitrate and/or a plurality of bitrates determined based on the content element associated with the respective portion of the content. The network device may receive/retrieve the content from storage and/or any other device. The network device may receive/retrieve the plurality of content elements and/or the content from storage and/or any other device based on the plurality of references to the content. For example, network device may receive/retrieve a manifest file, an index file, a multimedia file, a text file, code, a script, metadata, resource location(s), combinations thereof, or the like comprising the plurality of content elements and the plurality of references to the content.

At 730 one or more bitrates associated with the content may be selected. The network device (e.g., a content player, the media device 120, a smart device, the mobile device 124, a computing device, etc.) may select, based on a respective content element of the plurality of content elements, for each portion of the plurality of portions of the content, the one or more bitrates of the plurality of bitrates that are associated with the portion of the content. The network device may select the one or more bitrates according a content element associated with the portion of the content. The network device may select the one or more bitrates to achieve a best possible quality consumption of the portion of the content. For example, quality (e.g., picture quality, sound quality, visual quality, etc.) consumption of content may be content that may be consumed (e.g., displayed, watched, listened to, etc.) without perceived changes in video quality (e.g., no image artifacts, no blurred images, no unintentionally paused and/or delayed video, etc.), audio quality (e.g., no unintentional changes in volume, no changes in sound clarity, etc.), and or the like.

The network device (e.g., a content player, the media device 120, a smart device, the mobile device 124, a computing device, etc.) may use the content element associated with the portion of the content to determine/select a bitrate of the one or more plurality of bitrates associated with the portion of the content that will enable the portion content to be consumed at the best quality. For example, if the network device (or a user associated with the network device) is consuming the content, the network device may automatically select/adjust a bitrate of the one or more bitrates associated with the portion of the content because the content element indicates that the quality of consumption will either not be impacted or will be enhanced by a selection/adjustment of a bitrate, such as an selection/adjustment to a lower bitrate, or a higher bitrate compared to a bitrate at which other portions of the content are/can be consumed.

At 710 each portion of the plurality of portions of the content may be received/retrieved. The network device may receive/retrieve each portion of the plurality of portions of the content according to the selected bitrate. For example, the network device may use a manifest file, an index file, a multimedia file, a text file, code, a script, metadata, resource location(s), combinations thereof, or the like comprising the plurality of content elements and the plurality of references to the content to retrieve the content.

Figure 8:
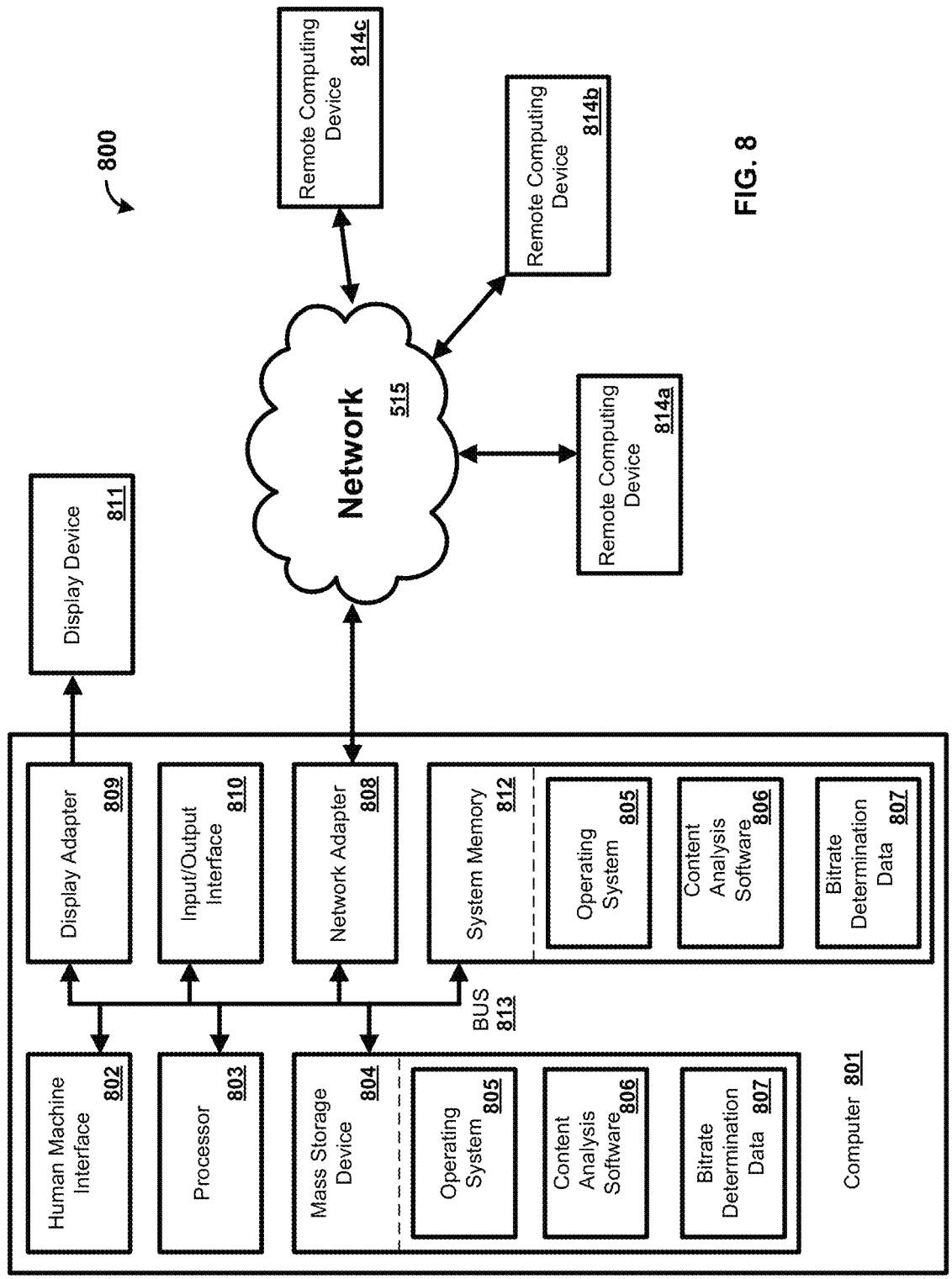
FIG. 8 shows a block diagram of a computing device for implementing variable bitrate content.

FIG. 8 shows a system 800 for providing variable bitrate content. The server 110, the application server 126, the content source 127, or the edge device 128 of FIG. 1, or any other device/component described herein may be a computer 801 as shown in FIG. 8.

The computer 801 may comprise one or more processors 803, a system memory 812, and a bus 813 that couples various components of the computer 801 including the one or more processors 803 to the system memory 812. In the case of multiple processors 803, the computer 801 may utilize parallel computing.

The bus 813 may comprise one or more of several possible types of bus structures, such as a memory bus, memory controller, a peripheral bus, an accelerated graphics port, and a processor or local bus using any of a variety of bus architectures.

The computer 801 may operate on and/or comprise a variety of computer readable media (e.g., non-transitory). Computer readable media may be any available media that is accessible by the computer 801 and comprises, non-transitory, volatile and/or non-volatile media, removable and non-removable media. The system memory 812 has computer readable media in the form of volatile memory, such as random access memory (RAM), and/or non-volatile memory, such as read only memory (ROM). The system memory 812 may store data such as bitrate determination data 807 and/or program modules such as operating system 805 and content analysis software 806 that are accessible to and/or are operated on by the one or more processors 803.

The computer 801 may also comprise other removable/non-removable, volatile/non-volatile computer storage media. The mass storage device 804 may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 804. An operating system 805 and content analysis software 806 may be stored on the mass storage device 804. One or more of the operating system 805 and content analysis software 806 (or some combination thereof) may comprise program modules and the content analysis software 806. Bitrate determination data 807 may also be stored on the mass storage device 804. Bitrate determination data 807 may be stored in any of one or more databases known in the art. The databases may be centralized or distributed across multiple locations within the network 815.

A user may enter commands and information into the computer 801 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

A display device 811 may also be connected to the bus 813 via an interface, such as a display adapter 809. It is contemplated that the computer 801 may have more than one display adapter 809 and the computer 801 may have more than one display device 811. A display device 811 may be a monitor, an LCD (Liquid Crystal Display), light emitting diode (LED) display, television, smart lens, smart glass, and/or a projector. In addition to the display device 811, other output peripheral devices may comprise components such as speakers (not shown) and a printer (not shown) which may be connected to the computer 801 via Input/Output Interface 810. Any step and/or result of the methods may be output (or caused to be output) in any form to an output device. Such output may be any form of visual representation, including, but not limited to, textual, graphical, animation, audio, tactile, and the like. The display 811 and computer 801 may be part of one device, or separate devices.

The computer 801 may operate in a networked environment using logical connections to one or more remote computing devices 814a,b,c. A remote computing device 814a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 801 and a remote computing device 814a,b,c may be made via a network 815, such as a local area network (LAN) and/or a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components may reside at various times in different storage components of the computing device 801, and are executed by the one or more processors 803 of the computer 801. An implementation of content analysis software 806 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving a first portion of content comprising an encoding parameter, wherein the encoding parameter indicates a level of encoding complexity of the first portion of the content;
   assigning, based on the level of encoding complexity of the first portion of the content satisfying a threshold, a first bitrate to the first portion of the content;
   receiving a second portion of the content comprising scene-level metadata, wherein the scene-level metadata indicates an audio level associated with the second portion of the content;
   assigning, based on the audio level associated with the second portion of the content satisfying an audio level threshold, the first bitrate to the second portion of the content; and
   sending the first portion of the content and the second portion of the content at the first bitrate.

2. The method of claim 1, further comprising:
   receiving a third portion of the content comprising another encoding parameter, wherein the another encoding parameter indicates a level of encoding complexity of the third portion of the content; and
   assigning, based on the level of encoding complexity of the third portion of the content not satisfying the threshold, a second bitrate to the third portion of the content.

3. The method of claim 2, further comprising:
   receiving a fourth portion of the content comprising scene-level metadata of the fourth portion of the content;
   assigning, based on the scene-level metadata of the fourth portion of the content indicating an audio level associated with the fourth portion of the content that does not satisfy the audio level threshold, the second bitrate to the fourth portion of the content; and
   sending the third portion of the content and the fourth portion of the content at the second bitrate.

4. The method of claim 1, wherein the level of encoding complexity of the first portion of the content is based on at least one of a prediction frame error, a relative size of an inter-coded frame of a respective portion of the content with respect to an intra-coded frame of the respective portion of the content, or a number of motion vectors to encode a frame of the respective portion of the content.

5. The method of claim 1, wherein the audio level threshold is based on an audio level associated with a previous portion of the content.

6. The method of claim 1, wherein sending the first portion of the content and the second portion of the content at the first bitrate comprises:
   determining, based on the first bitrate, a location of the first portion of the content and a location of the second portion of the content;
   generating a manifest file comprising a reference to the location of the first portion of the content and a reference to the location of the second portion of the content; and
   sending, to a user device, the manifest file.

7. A method comprising:
   receiving a portion of content comprising an encoding parameter and scene-level metadata, wherein the encoding parameter indicates a level of encoding complexity of the portion of the content and the scene-level metadata indicates an audio level associated with the portion of the content;
   assigning, based on at least one of the level of encoding complexity of the portion of the content satisfying a threshold or the audio level associated with the portion of the content satisfying an audio level threshold, a first bitrate to the portion of the content;
   receiving another portion of content comprising another encoding parameter and different scene-level metadata, wherein the another encoding parameter indicates a level of encoding complexity of the another portion of the content and the different scene-level metadata indicates an audio level associated with the another portion of the content; and
   assigning, based on at least one of: the level of encoding complexity of the another portion of the content not satisfying the threshold or the audio level associated with the another portion of the content satisfying the audio level threshold, a second bitrate to the another portion of the content.

8. The method of claim 7, further comprising sending the portion of the content at the first bitrate.

9. The method of claim 7, further comprising sending the another portion of the content at the second bitrate.

10. The method of claim 7, wherein the level of encoding complexity of the portion of the content or the of the another portion of the content is based on at least one of a prediction frame error, a relative size of an inter-coded frame of the respective portion of the content with respect to an intra-coded frame of the respective portion of the content, or a number of motion vectors to encode a frame of the respective portion of the content.

11. The method of claim 7, wherein the level of encoding complexity of the portion of the content or the of the another portion of the content indicates an amount of change between a first plurality of pixels associated with a previous portion of the content and a second plurality of pixels associated with the respective portion of the content, wherein the first plurality of pixels correspond to the second plurality of pixels.

12. The method of claim 7, wherein the audio level threshold is based on an audio level associated with a previous portion of the content.

13. The method of claim 7, wherein the scene-level metadata further indicates a complexity of the portion of the content and the different scene-level metadata further indicates a complexity of the another portion of the content, wherein at least one of the complexity of the portion of the content or the complexity of the another portion of the content is based on at least one of an advertisement, a scene transition, pixel illumination, or closed captioning information.

14. The method of claim 8, wherein sending the portion of the content at the first bitrate comprises:
determining, based on the first bitrate, a location for the portion of the content;
generating a manifest file comprising a reference to the location; and
sending, to a user device, the manifest file.

15. The method of claim 7, wherein receiving the portion of the content comprising the level of encoding complexity of the portion of the content and the scene-level metadata is based on a user device accessing the portion of the content.

16. A method comprising:
receiving a portion of content comprising an encoding parameter and scene-level metadata, wherein the encoding parameter indicates a level of encoding complexity of the portion of the content and the scene-level metadata indicates an audio level associated with the portion of the content; and
assigning a bitrate to the portion of the content, wherein assigning the bitrate comprises:
assigning, based on at least one of: the level of encoding complexity of the portion of the content satisfying a threshold or the audio level associated with the portion of the content satisfying an audio level threshold, a first bitrate to the portion of the content; or
assigning, based on at least one of the level of encoding complexity of the portion of the content not satisfying the threshold and the audio level associated with the portion of the content not satisfying the audio level threshold, a second bitrate to the portion of the content.

17. The method of claim 16 further comprising sending the portion of the content at the second bitrate.

18. The method of claim 17, wherein sending the portion of the content at the second bitrate comprises:
determining, based on the second bitrate, a location for the portion of the content;
generating a manifest file comprising a reference to the location; and
sending, to a user device, the manifest file.

19. The method of claim 16, wherein the level of encoding complexity of the portion of the content is based on at least one of a prediction frame error, a relative size of an inter-coded frame of the respective portion of the content with respect to an intra-coded frame of the respective portion of the content, and a number of motion vectors to encode a frame of the respective portion of the content.

20. The method of claim 16, wherein the level of encoding complexity of the portion of the content indicates an amount of change between a first plurality of pixels associated with a previous portion of the content and a second plurality of pixels associated with the respective portion of the content, wherein the first plurality of pixels correspond to the second plurality of pixels.

21. The method of claim 16, wherein the audio level threshold is based on an audio level associated with a previous portion of the content.

22. The method of claim 16, wherein the scene-level metadata further indicates a complexity of the portion of the content, wherein the complexity of the portion of the content is based on at least one of an advertisement, a scene transition, pixel illumination, and closed captioning information.

* * * * *